(12) United States Patent
Terajima et al.

(10) Patent No.: US 6,785,026 B1
(45) Date of Patent: Aug. 31, 2004

(54) IMAGE READING APPARATUS AND CONTROL METHOD THEREFOR

(75) Inventors: Hisao Terajima, Ibaraki-ken (JP); Yasuyuki Shinada, Abiko (JP); Takashi Ono, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,445

(22) Filed: Apr. 8, 1999

(30) Foreign Application Priority Data

Apr. 10, 1998 (JP) .......................................... 10-098947

(51) Int. Cl.⁷ ............................. H04N 1/46; H04N 1/04
(52) U.S. Cl. ...................... 358/509; 358/513; 358/504; 358/475; 358/482
(58) Field of Search .............................. 358/474, 509, 358/475, 505, 506, 487, 445, 514, 513, 512, 483, 482, 461, 504, 406; 250/208.1, 234–236, 205; 382/312, 313, 318, 319, 317, 274; 362/800; 348/96–98

(56) References Cited

U.S. PATENT DOCUMENTS

| | | | | |
|---|---|---|---|---|
| 4,679,073 A | * | 7/1987 | Hayashi ...................... | 358/509 |
| 4,731,661 A | | 3/1988 | Nagano ....................... | 358/509 |
| 5,450,215 A | | 9/1995 | Iwama ......................... | 358/509 |
| 5,625,470 A | | 4/1997 | Ueta et al. ................... | 358/505 |
| 6,456,748 B1 | | 9/2002 | Yushiya et al. ............. | 382/312 |

FOREIGN PATENT DOCUMENTS

| | | | | |
|---|---|---|---|---|
| EP | 0949800 A2 | * 10/1999 | ............ | H04N/1/04 |
| JP | 4-297177 | 10/1992 | ............ | H04N/1/04 |
| JP | A 10-126576 | 5/1998 | | |
| JP | 10-126576 | * 5/1998 | | |
| JP | A 10-56577 | 9/2002 | | |

OTHER PUBLICATIONS

English Abstract for JPA 10–56577 Corresponding US Pat. No. 6,456,748.
English Abstract for JPA 10–126576.
Office Action dated Apr. 1, 2003 from corresponding Japanese Patent Applciation No. 107790.
European Search Report for corresponding European Application 99302741.6–2202 (Sep. 4, 2000).
English Abstract for JP4–297177 from Japanese Patent Office.

* cited by examiner

Primary Examiner—Cheukfan Lee
(74) Attorney, Agent, or Firm—Morgan & Finnegan, L.L.P.

(57) ABSTRACT

An image reading apparatus individually reads a predetermined white reference plate by flickering light sources of the respective colors before an original image is read by sequentially turning on the light sources during one line sync period. The flickering duty ratio of the light source obtained when the white reference plate is read is set for each color so as to maximize the output value from an A/D converter within its predetermined conversion range. When an original is read, the image reading apparatus changes the emission color by switching the light source to be flickered every line sync period, and turns on the light sources of the respective colors in accordance with different duty ratios set for these colors.

23 Claims, 16 Drawing Sheets

IMAGE READING APPARATUS AND CONTROL METHOD THEREFOR

BACKGROUND OF THE INVENTION

1. Field of the Invention

The present invention relates to an image reading apparatus and control method therefor suitably used for, e.g., a color scanner or color facsimile apparatus having an image reading unit which has three, R, G, and B (Red, Green, and Blue) light sources and reads an original image by sequentially turning on the light sources.

2. Description of the Related Art

A color scanner or color facsimile apparatus having a reading unit capable of reading a color image by switching the emission colors of light sources has conventionally been known. This apparatus uses three, red, green, and blue (to be referred to as R, G, and B) LEDs as a light source, and a line image sensor as a reading unit. In this image sensor, light of each color emitted from the LED illuminates a portion of an original including an image, and the light reflected by the original surface is incident on a sensor IC via a lens array.

The line image sensor constituted by the sensor IC has a photoelectric conversion element such as a photodiode and a capacitor for each pixel, and converts incident light into a current to accumulate the current as charges in the capacitor. The accumulated charges are sequentially converted into a voltage and output from the sensor. The voltage output is converted into digital data by an A/D converter, and the digital data is subjected to various image processes to generate a scanner or facsimile output. Color read operation in a general color scanner having light sources of three colors is as follows. That is, the red LED is turned on to read one line in the main scanning direction, thereby obtaining the red component of one line of a color image. The green LED is turned on to obtain the green component of one line. The blue LED is turned on to obtain the blue component of one line.

In the color scanner of this type, an original is conveyed in the subscanning direction during an image read for one line by the LEDs of three colors. After one line is read by the LEDs of three colors, the original has been conveyed by one line. That is, the original read operation and the convey operation in the subscanning direction are simultaneously performed. These operations are repeated a plurality of number of times to read a color image of one original page. This read control method will be called "scan and read".

In this reading system, since the LED light sources of the respective colors have different light quantities, a voltage output from the image sensor may exceed a predetermined A/D convertible range of the A/D converter. An output voltage from the image sensor must be limited to fall within the A/D convertible range of the A/D converter by adjusting the duty ratio of the ON time of the LED of each color in one period of time (to be simply referred to as period) of a line sync signal.

The LEDs are turned on in synchronism with a line sync signal but turned off at different timings in units of colors (in units of LEDs). More specifically, when the light emission quantity of LED is large, the LED is turned off soon; when the light emission quantity is small, the LED is turned off late. The OFF timings automatically determined by the CPU for controlling the apparatus. While the CPU turns on these LEDs, an original is actually read. In this read control, an original is conveyed in the subscanning direction during read of the original. Since the read period is different between the respective colors, the width of the read range in the subscanning direction is different between the respective colors.

This will be shown in FIG. 15. In FIG. 15, the ON periods (high-level portions of rectangular waves) of LEDs of the respective colors are longer in the order from R, G, and B. The light-receiving unit of the image sensor has an opening with a width corresponding to one line in the subscanning direction. The image sensor converts the light quantity reflected by an original surface facing this opening into charges, and accumulates the charges. An original surface facing the sensor opening from the ON timing to the OFF timing of the light source is an actual read range. As is apparent from FIG. 15, the width of the read range in the subscanning direction is longer in the order from R, G, and B.

In reading a monochrome image by the color facsimile apparatus, i.e., in reading a facsimile transmission image, all the light sources of three colors are simultaneously turned on as a white light source to read an image. Alternatively, an image is read using only a light source of one color, e.g., green out of light sources of three colors.

However, as described above, since the width of the read range in the subscanning direction is different between the respective colors, the resolution in the subscanning direction differs between the respective colors. As a result, read data of an originally black thin horizontal line does not indicate black, resulting in poor color reproducibility in reading a halftone original.

In the prior art, when the light sources of three colors are simultaneously turned on to read a monochrome image, the power is greatly consumed. The light emission quantity of the light source increases to require a heat dissipation structure, resulting in a large outer shape of the reading unit. Since the three light sources vary in light quantity, they do not function as a complete white light source. If an original to be read is a color original, a color close to one having a large light quantity has a low read density, and the original density cannot be accurately expressed. This problem becomes more serious :in reading an original in a pseudo halftone mode.

To the contrary, when a monochrome original is read by turning on only a light source of one color (monochrome mode), if monochrome originals are frequently read, the light source of that color degrades sooner than the remaining light sources. The degradation of the light source must be finely corrected in reading a color original (color mode). This problem becomes notable when an LED is used as a light source. When a color original is read in the monochrome mode, the same color as the light source cannot be read.

The present invention has been made to solve these problems, and has as its first object to attain the same resolution in the subscanning direction for the respective colors in reading an image and improve the color reproducibility of a black thin horizontal line or halftone original even if variations in light quantities of light sources of a plurality of colors are adjusted in a reading system of reading an original image while scanning.

It is the second object of the present invention to read a high-quality image without any dropout color with small power consumption and eliminate variations in degradation of light sources when a monochrome image is read.

SUMMARY OF THE INVENTION

To achieve the above objects, an image reading apparatus according to the present invention has the following arrangement.

More specifically, an image reading apparatus which reads an original image by sequentially irradiating an original image with a plurality of emission colors and detecting light of each color from the original image by an image sensor comprises a light source capable of sequentially generating the plurality of emission colors, and control means for setting a flickering duty ratio of the light source for each emission color, when the original image is read, changing the emission color every predetermined charge accumulation period of the image sensor, and flickering the light source in accordance with the duty ratio set for each emission color.

The control means may set a flickering duty ratio of another emission color using, as a reference, a total ON time of one of the plurality of emission colors in a predetermined charge accumulation period of the image sensor, when the original image is read, change the emission color every charge accumulation period, and flicker the light source with another emission color in accordance with the duty ratio set for each emission color.

At this time, for example, the control means calculates the flickering duty ratio of the light source for each emission color, calculates a product of the calculated duty ratio and the predetermined charge accumulation period of the image sensor to calculate the total ON time for each color, and selects a product of an emission color having the largest calculated value as the reference total ON time.

In any of the above apparatus arrangements, when a reference white background is irradiated by flickering the light source with one of the plurality of emission colors, and an output value from the image sensor is smaller than a predetermined value and comes nearest to the predetermined value, the control means sets a flickering duty ratio at this time as an optimum duty ratio for the emission color, the control means repeating the duty ratio setting operation for each of the plurality of emission colors.

Alternatively, an image reading apparatus which reads an original image by sequentially irradiating the original image with a plurality of emission colors and detecting light of each color from the original image by an image sensor comprises a light source capable of sequentially generating the plurality of emission colors, and control means for setting light emission times of the plurality of emission colors in a predetermined charge accumulation period of the image sensor, when the original image is read, sequentially changing the emission colors during the charge accumulation period, and turning on the light source in accordance with the light emission time set for each emission color.

At this time, for example, when a reference white background is irradiated by turning on the light source with one of the plurality of emission colors, and an output value from the image sensor is smaller than a predetermined value and comes nearest to the predetermined value, the control means sets a light emission time at this time as an optimum light emission time for the emission color, the control means repeating the light emission time setting operation for each of the plurality of emission colors.

Further, in a monochrome mode, the control means sequentially changes the emission colors during the charge accumulation period, and forms a pseudo white light source by turning on the light source in accordance with the light emission time set for each emission color.

To achieve the above objects, an image reading apparatus according to the present invention has the following arrangement.

More specifically, an image reading apparatus which reads an original image by detecting, by an image sensor, light from the original image irradiated by a light source comprises control means for controlling a single light source for irradiating the original image to flicker a plurality of number of times every predetermined charge accumulation time of the image sensor when the original image is read.

The control means adjusts a flickering duty ratio when the light source flickers.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of the present invention will be described below with reference to the accompanying drawings.

First Embodiment

Figure 1:
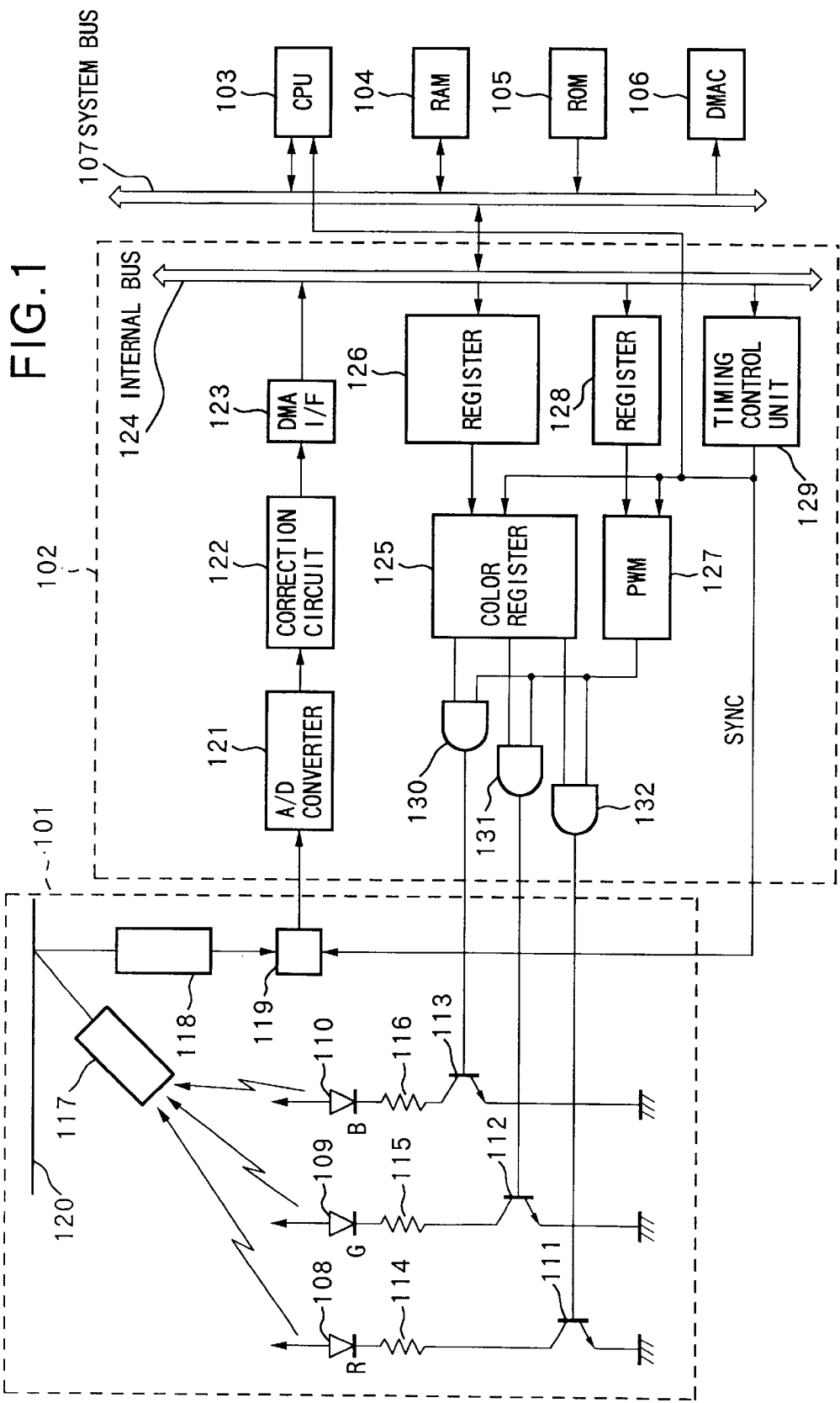
FIG. 1 is a block diagram showing an example of the arrangement of a color scanner according to the first embodiment of the present invention.

FIG. 1 best shows the feature of an image reading apparatus according to the present invention by exemplifying the arrangement of a color scanner. In FIG. 1, reference numeral 101 denotes a sensor unit constituted by integrating an image sensor such as a CCD (Charge Coupled Device) and a light source such as an LED (Light Emitting Diode); and 102, a read control unit for controlling an original reading unit and performing image processing of read data.

Reference numeral 103 denotes a CPU for controlling the whole system; 104, a RAM used as a work area of the CPU 103 and an image data memory area; 105, a ROM for storing control programs of the CPU 103; and 106, a DMA controller for performing DMA (Direct Memory Access) transfer between the read control unit 102 and RAM 104.

The read control unit 102, CPU 103, RAM 104, ROM 105, and DMA controller 106 are connected to each other via a system bus 107. The CPU 103 accesses the blocks connected to the system bus 107 in accordance with a control program in the ROM 105.

The internal arrangement of the sensor unit 101 will be described. Reference numerals 108, 109, and 110 denote LED light sources for emitting R, G, and B light beams; 111, 112, and 113, switches which control the ON/OFF states of the R, G, and B LED light sources 108, 109, and 110, are formed from transistors in the first embodiment, and turn on the LEDs while the collector-to-emitter path is ON; and 114, 115, and 116, limiting resistors for the LED light sources 108, 109, and 110.

Reference numeral 117 denotes a conductor for dispersing light input from the LED light sources 108, 109, and 110 in the main scanning direction and uniformly illuminating a read line on an original 120; and 118, a lens array. Light reflected by the original 120 is input via the lens array 118 to a sensor IC 119 where the light is converted into an electrical signal, i.e., a voltage proportional to the light reflected by the original 120. When the sensor IC 119 receives a line sync signal SYNC from a timing control unit 129 in the read control unit 102, it initializes an internal pixel counter and sequentially outputs converted voltages in light-receiving elements aligned in the main scanning direction.

The internal arrangement of the read control unit 102 will be described. Reference numeral 121 denotes an A/D converter which converts an analog output voltage from the sensor IC 119 into digital multivalued image data, and converts a voltage into digital data of about 256 gray levels per pixel; and 122, a correction circuit for correcting variations in sensitivity of the sensor 119, variations in light quantities of the LED light sources 108, 109, and 110, and nonlinearity of the sensor 119 with respect to an incident light quantity by performing digital calculation or conversion with reference to a table for a digital output from the A/D converter 121, and for outputting the obtained data.

Reference numeral 123 denotes a DMA interface for receiving image data corrected by the correction circuit 122 and outputting the input data to an internal bus 124 in accordance with timing control of the DMA controller 106. The image data output to the internal bus 124 is written in the RAM 104 via the system bus 107.

Reference numeral 125 denotes a color register for storing a light source color designation signal for designating a light source to be turned on. The output of the color register 125 is connected to the switches 111, 112, and 113 in the sensor unit 101 via AND gates 130, 131, and 132. When one of the three outputs of the color register 125 changes to high level, a corresponding transistor is turned on to turn on a corresponding light source. The color register 125 receives data in a register 126 in synchronism with a sync signal SYNC from the timing control unit 129. In other words, the color register 125 updates the light source color designation signal as an output from the color register 125 in synchronism with the sync signal SYNC.

Reference numeral 127 denotes a PWM (Pulse Width Modulation) waveform generator which generates a periodic rectangular wave, incorporates a register for storing a flickering duty ratio, and generates a waveform having a predetermined duty ratio of high and low levels in accordance with the value of the internal register. This internal register receives data in a register 128 in synchronism with the sync signal SYNC from the timing control unit 129. The duty ratio is determined and stored in the register in steps S4 to S7 in FIG. 2 (to be described later). The duty ratio of the PWM waveform generator 127 is updated in synchronism with the sync signal SYNC.

The output of the PWM waveform generator 127 is connected to the switches 111, 112, and 113 in the sensor unit 101 via the AND gates 130, 131, and 132. By this connection, any one of the AND gates 130, 131, and 132 selected by a light source color designation signal in the color register 125 outputs a waveform generated in the PWM waveform generator 127. Then, any one of the LED light sources 108, 109, and 110 selected by the light source color designation signal flickers with a duty ratio set in the internal register of the PWM waveform generator 127.

As described above, the timing control unit 129 generates the line sync signal SYNC. The sync signal SYNC is supplied to the CPU 103 in addition to the sensor IC 119, color register 125, and PWM waveform generator 127. When the CPU 103 receives the sync signal SYNC, it shifts to interrupt processing and writes values in the registers 126 and 128 via the system and internal buses 107 and 124 in the interrupt routine. That is, the CPU 103 can reserve a light source color designation signal and PWM duty signal for a next sync signal SYNC in the registers 126 and 128.

Figure 2:
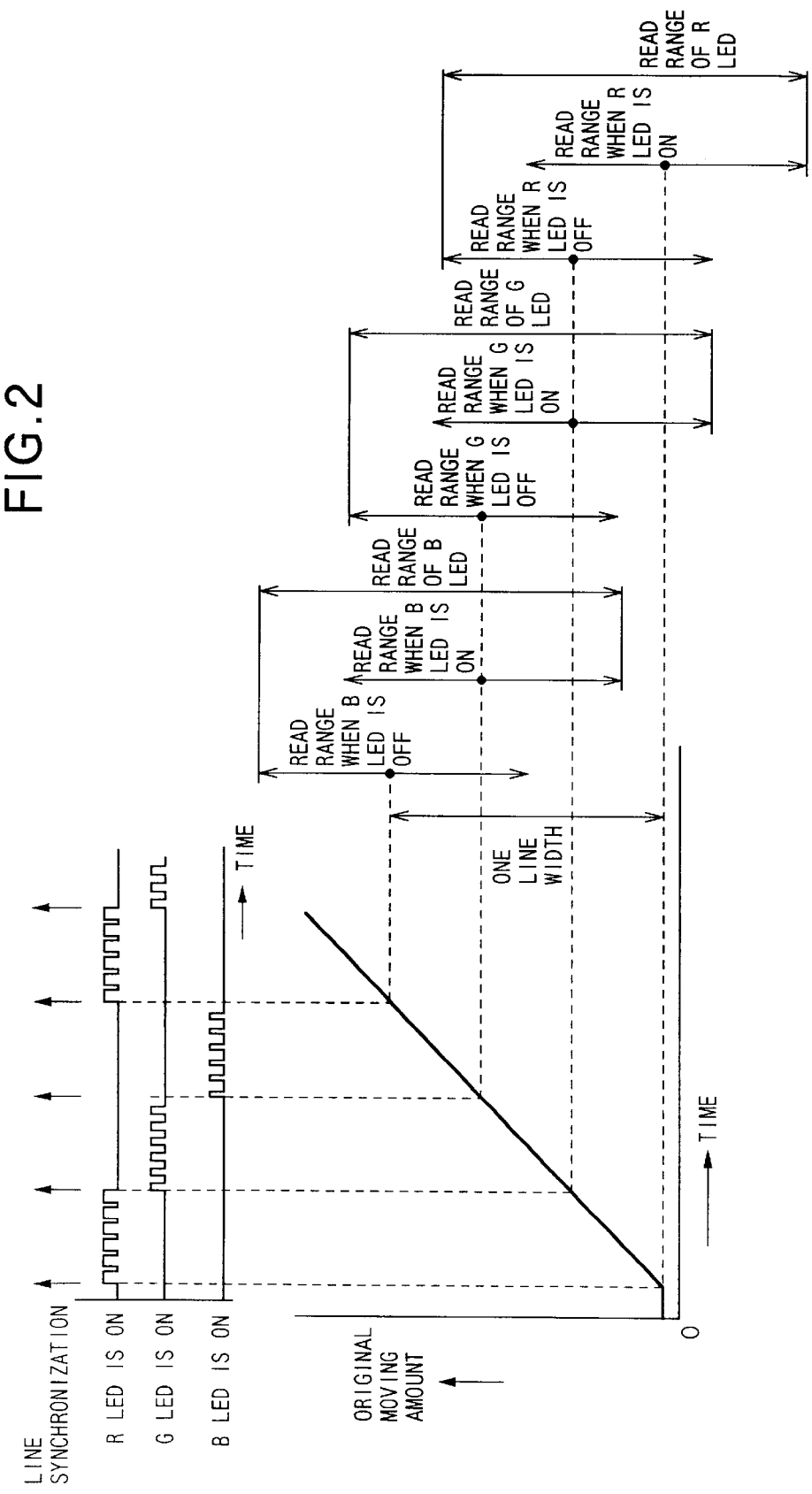
FIG. 2 is a view for explaining the relationship between the ON state of each LED and the original read position according to the first embodiment of the present invention.

In the first embodiment, since the emission color of the light source and the flickering duty ratio can be changed in synchronism with the sync signal SYNC, the light source can be controlled as shown in FIG. 2. That is, any R, G, and B light sources can be flickered at different optimum duty ratios set in the register 126 during one line sync period (i.e., a predetermined charge accumulation period of the image sensor included in the sensor unit 101). Even if the width of the original read range in the subscanning direction is the same for the respective light source colors, the total light emission quantity by flickering during one charge accumulation period (to be simply referred to as an accumulation period) can be changed for each light source color to appropriately control an output voltage from the image sensor 119.

While the LED light sources 108, 109, and 110 have different total light emission quantities during one line sync period, they can have the same resolution in the subscanning direction. An output voltage from the image sensor 119 can be limited to fall within the convertible range of the A/D converter 121, and the color reproducibility of a thin horizontal line or halftone dot image on an original can be improved.

Setting of parameters in the registers 126 and 128 will be explained with reference to the flow chart in FIG. 3.

Figure 3:
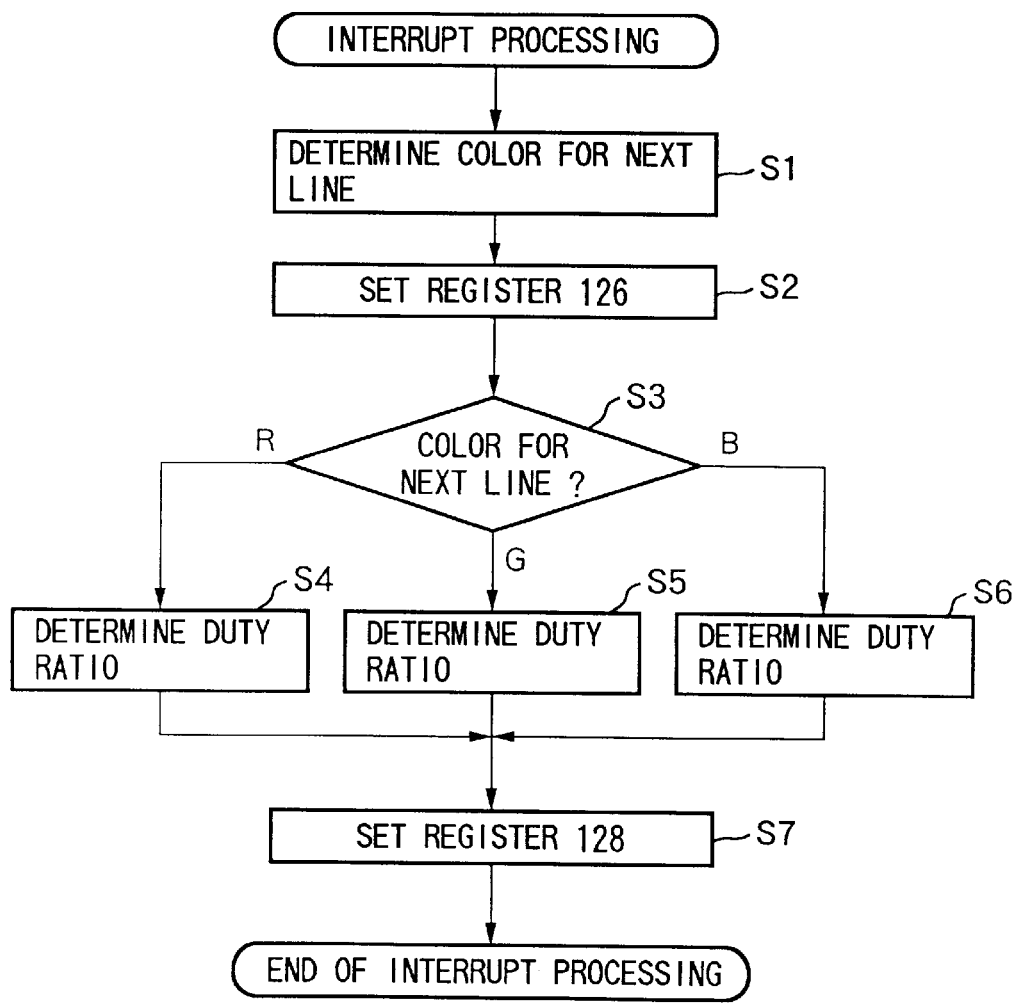
FIG. 3 is a flow chart showing interrupt processing according to the first embodiment of the present invention.

When the timing control unit 129 in FIG. 1 outputs a sync signal SYNC, the CPU 103 receives it and performs interrupt processing shown in the flow chart of FIG. 3. The interrupt processing has the following steps.

The CPU 103 determines the light source color for the next line in step S1, and writes the determined color information in the register 126 in step S2. As a result, the light source color for a read which starts from the next sync signal SYNC is reserved. The CPU 103 determines the color for the next output line in step S3. If the color for the next output line is R, the CPU 103 advances to step S4; if the color is G, to step S5; and if the color is B, to step S6.

In steps S4, S5, and S6, the CPU 103 determines the ratios of the ON times of the LED light sources 108, 109, and 110 to one line sync period as PWM duty ratios. A method of determining the duty ratio will be described.

Figure 16:
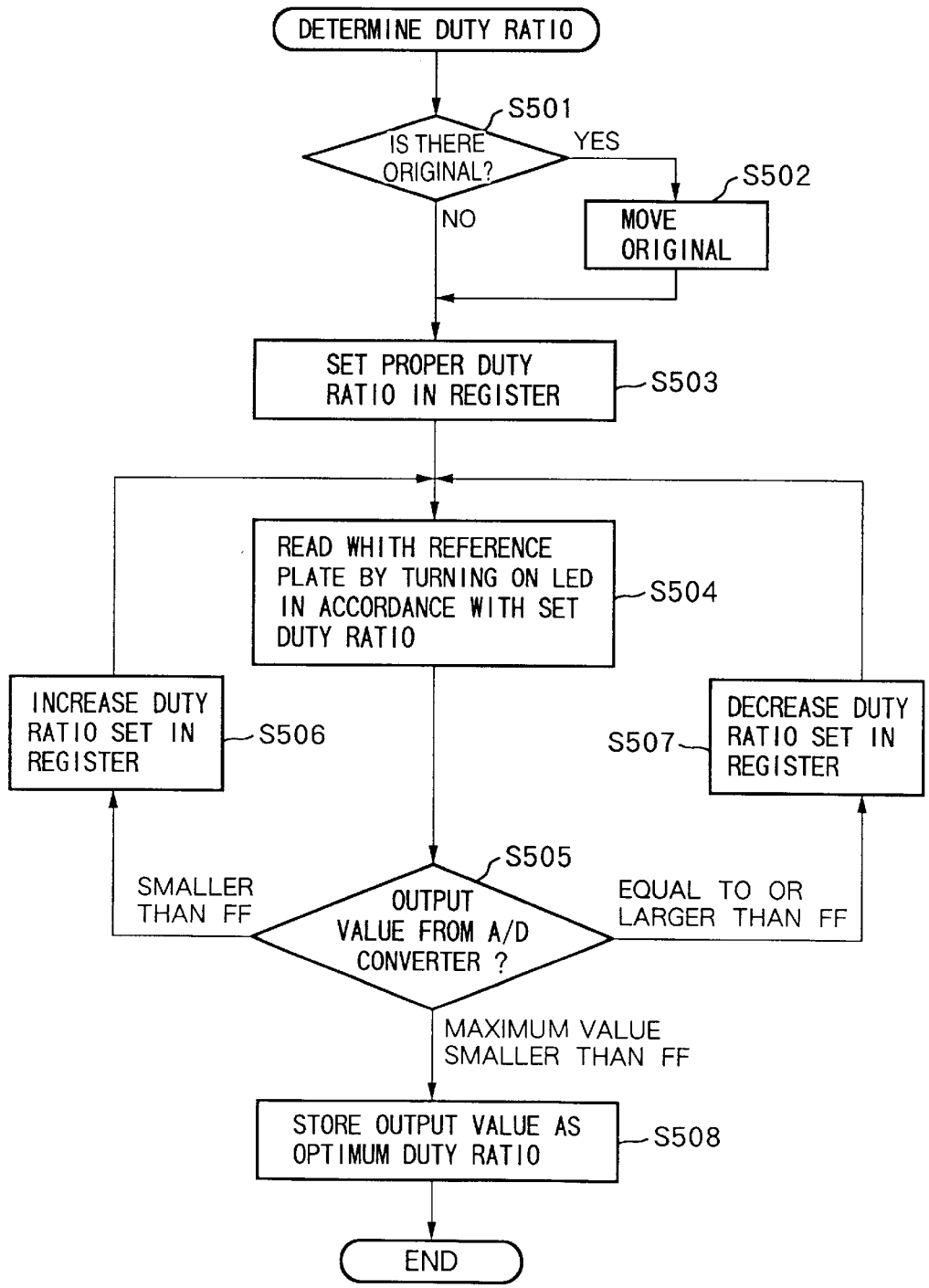
FIG. 16 is a flow chart showing a process of determining the duty ratio of the LED in the first embodiment.

FIG. 16 is a flow chart showing duty ratio determination processing in the first embodiment of the present invention which is executed by the CPU 103 for the LED light sources 108 to 110.

Steps S501 and S502 in FIG. 16: The CPU 103 determines whether an original is at a predetermined original read position (not shown) on the basis of an output value from an optical sensor (not shown). If NO in step S501 (the original is not at the original read position), the CPU 103 advances to step S503 (step S501). If YES in step S501 (the original is at the original read position), the CPU 103 retracts the original present at the original read position from this original read position to a predetermined retraction position by driving an original convey motor (not shown) (step S502).

Step S503: The CPU 103 sets an appropriate value as a provisional duty ratio in the register 126.

Steps S504 and S505: The CPU 103 turns on the selected LED in accordance with the duty ratio set in the register 126 to read a white reference plate set above the original read position (step S504) and detect a digital value output from the A/D converter 121 along with the read (step S505).

Step S507: If the value detected in step S502 is equal to or larger than FF, the current state is an overflow state in which the output value exceeds the A/D convertibility of the A/D converter 121. The CPU 103 sets in the register 126 a duty ratio smaller by predetermined value 1 than the duty ratio currently set in the register 126 (step S507), and returns to step S504.

Step S506: If the value detected in step S502 is smaller than FF, the CPU 103 sets in the register 126 a duty ratio higher by predetermined value 2 than the duty ratio currently set in the register 126 (step S506), and returns to step S504. In this case, predetermined value 2 is preferably smaller than the absolute value of predetermined value 1.

Step S508: If the value detected in step S502 is smaller than FF and is a maximum value at which the A/D converter 121 does not overflow, the duty ratio currently set in the register 126 is optimum for the selected LED, and the CPU 103 stores this duty ratio as an optimum duty ratio in the register 126.

The duty ratio determination processing is automatically executed at a timing, e.g., in adjustment immediately before shipment from the factory, in powering the image reading apparatus of the first embodiment, before reading the first original in reading a plurality of originals, or every predetermined time.

Referring back to FIG. 3, the CPU 103 writes the determined duty ratio in the register 128 in step S7. Accordingly, the flickering duty ratio of the light source in a read which starts from a next sync signal SYNC is reserved.

The light source color and flickering duty ratio for a next line are reserved instead of the light source color and flickering duty ratio for the current line which is being read in synchronism with the sync signal SYNC, because if the interrupt response time is long, light sources of two colors emit light in one line sync period to degrade the color reproducibility. In a system in which the interrupt response time is limited to an allowable range, the color register 125 and PWM waveform generator 127 may be directly connected to the internal bus 124, and the CPU 103 may set color information in the color register 125 in step S2 and write the flickering duty ratio in the internal register of the PWM waveform generator 127 in step S7.

As described above, in the first embodiment, the light emission duty ratio of the light source is set for each color in a read with R, G, and B in accordance with the flow chart shown in FIG. 16. Even if the light sources (LEDs) of the respective colors have different light emission quantities, they can have the same resolution in the subscanning direction. Even when the LED light sources vary in light quantity, they can have the same resolution in the subscanning direction in reading an image by the LED light sources. Therefore, a low-cost reading system with good color reproducibility of a thin horizontal line or halftone dot image on an original can be realized.

In the first embodiment, an image is read based on the light reflected by an original. However, the present invention is not limited to this, and can be applied to an apparatus of reading an image by, e.g., transmission light from a developed negative film or the like.

Second Embodiment

In the first embodiment, the light sources of the respective colors uniformly flicker during one line sync period, and an output voltage from the image sensor 119 is controlled by the ratio of flickering ON and OFF times, thereby improving the color reproducibility while preventing an output voltage from the image sensor 119 from exceeding the convertible range of the A/D converter 121.

Figure 15:
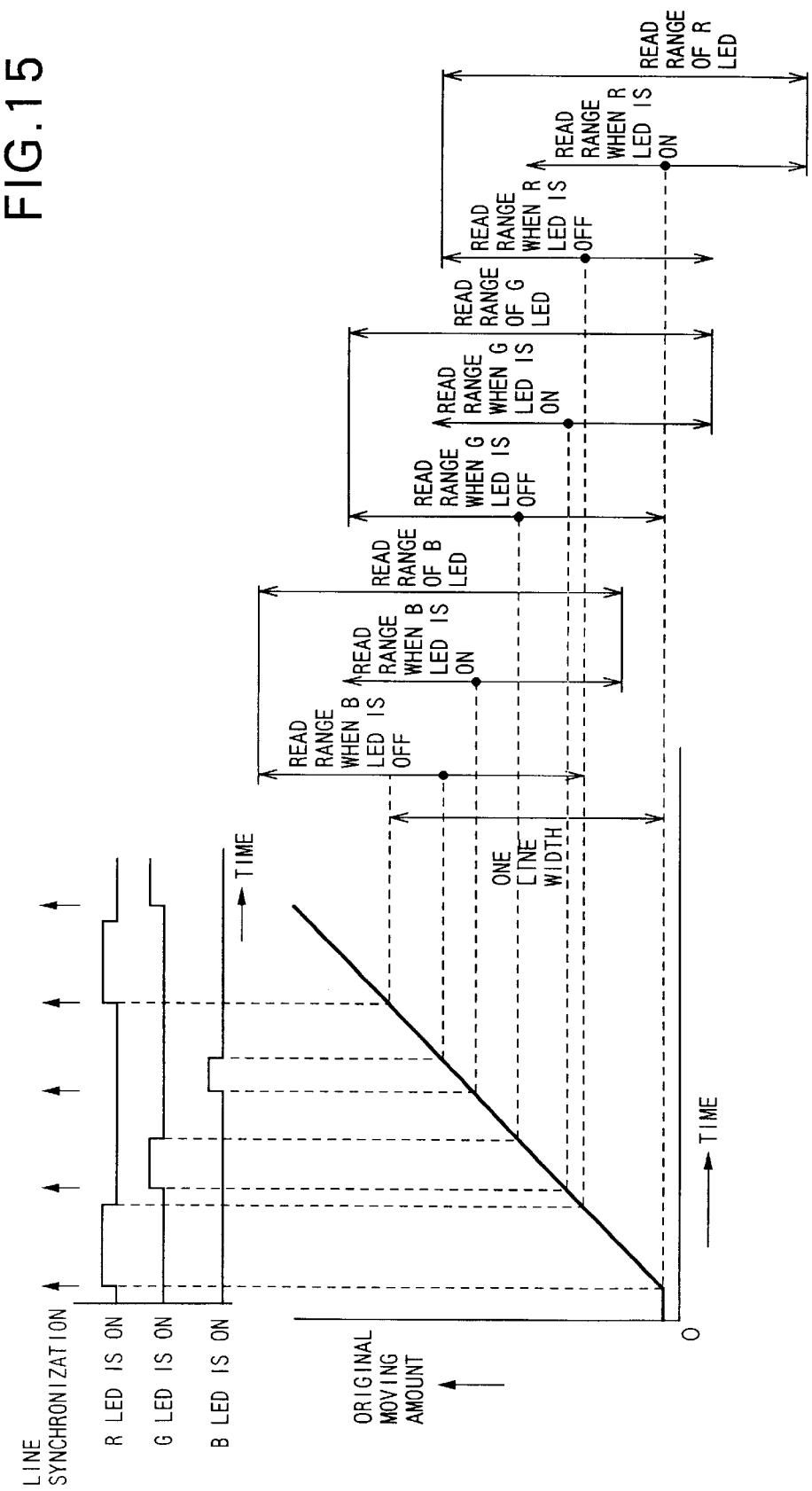
FIG. 15 is a view for explaining the relationship between the ON state of each LED and the original read position in the prior art.

The R, G, and B read ranges shown in FIG. 2 are wider than those shown in FIG. 15. Since the read range is ideally equal to one line width, the first embodiment shown in FIG. 2 exhibits better color reproducibility than in the prior art shown in FIG. 15 but is poorer in resolution. In the following second embodiment, therefore, the resolution in the subscanning direction is increased while maintaining good color reproducibility.

Figure 4:
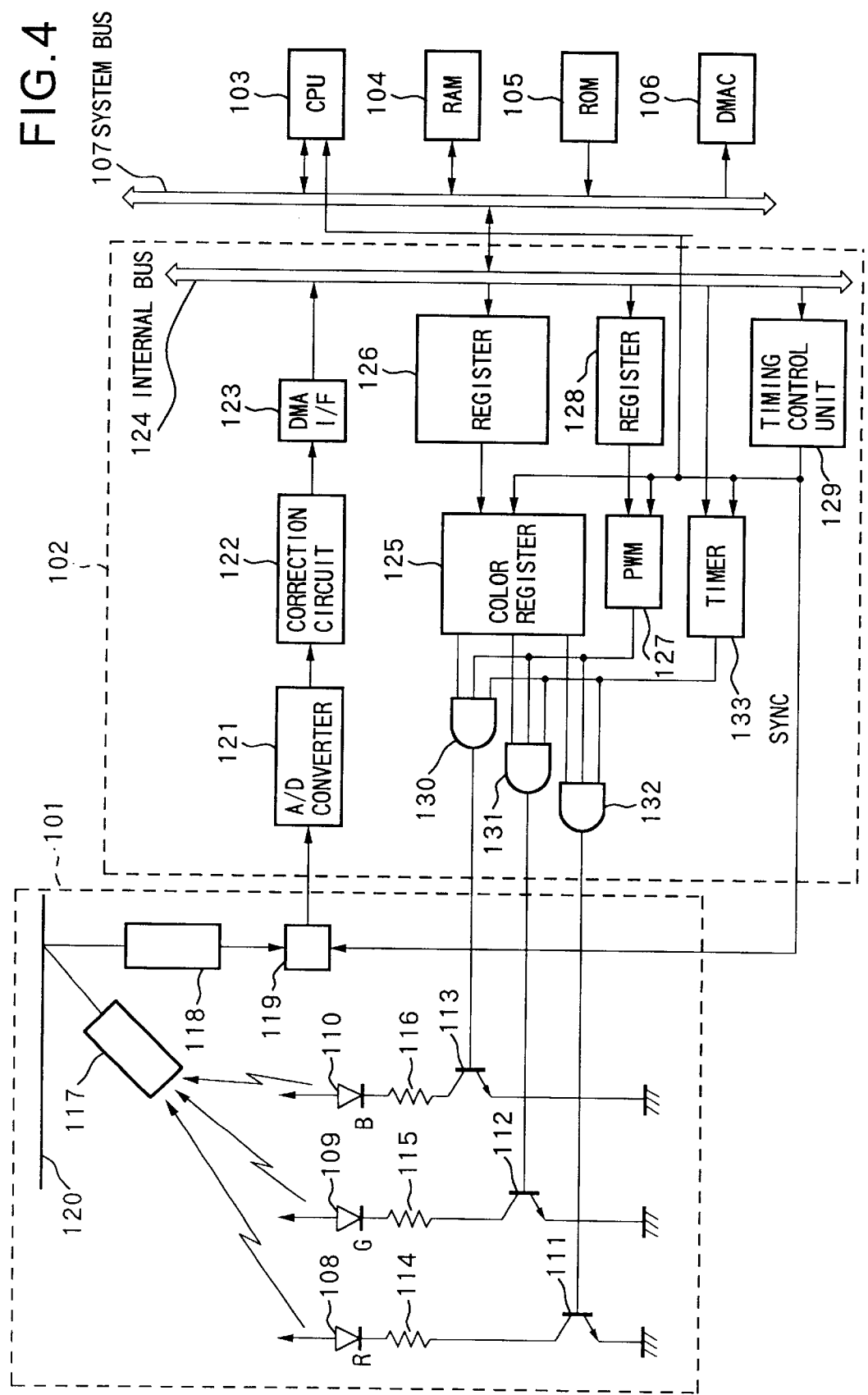
FIG. 4 is a block diagram showing an example of the arrangement of a color scanner according to the second embodiment of the present invention.

FIG. 4 best shows the feature of a color scanner according to the second embodiment. The same reference numerals as in FIG. 1 denote the same parts, and only a difference from the first embodiment shown in FIG. 1 will be described. As shown in FIG. 4, the second embodiment adopts a timer 133 in addition to the first embodiment.

The input of the timer 133 is connected to an internal bus 124 and a timing control unit 129. When the timer 133 receives a sync signal SYNC from the timing control unit 129, it changes the output to high level and then to low level upon the lapse of a predetermined time stored in an internal register. The output of the timer 133 is connected to switches 111, 112, and 113 in a sensor unit 101 via AND gates 130, 131, and 132.

By this connection, any one of the AND gates 130, 131, and 132 selected by a light source color designation signal in a color register 125 starts outputting a waveform generated in a PWM waveform generator 127 in synchronism with the sync signal SYNC, and stops outputting the waveform after the lapse of a predetermined time set in the timer 133. Then, one of LED light sources 108, 109, and 110 starts flickering with a duty ratio set in the PWM waveform generator 127, and stops flickering after the lapse of the predetermined time.

As described above, the input of the timer 133 is connected to the internal bus 124 to allow a CPU 103 to set the predetermined time in the internal register of the timer 133. The CPU 103 sets the time for turning off the LED light sources 108, 109, and 110 in the timer 133 prior to an original read operation.

Figure 6:
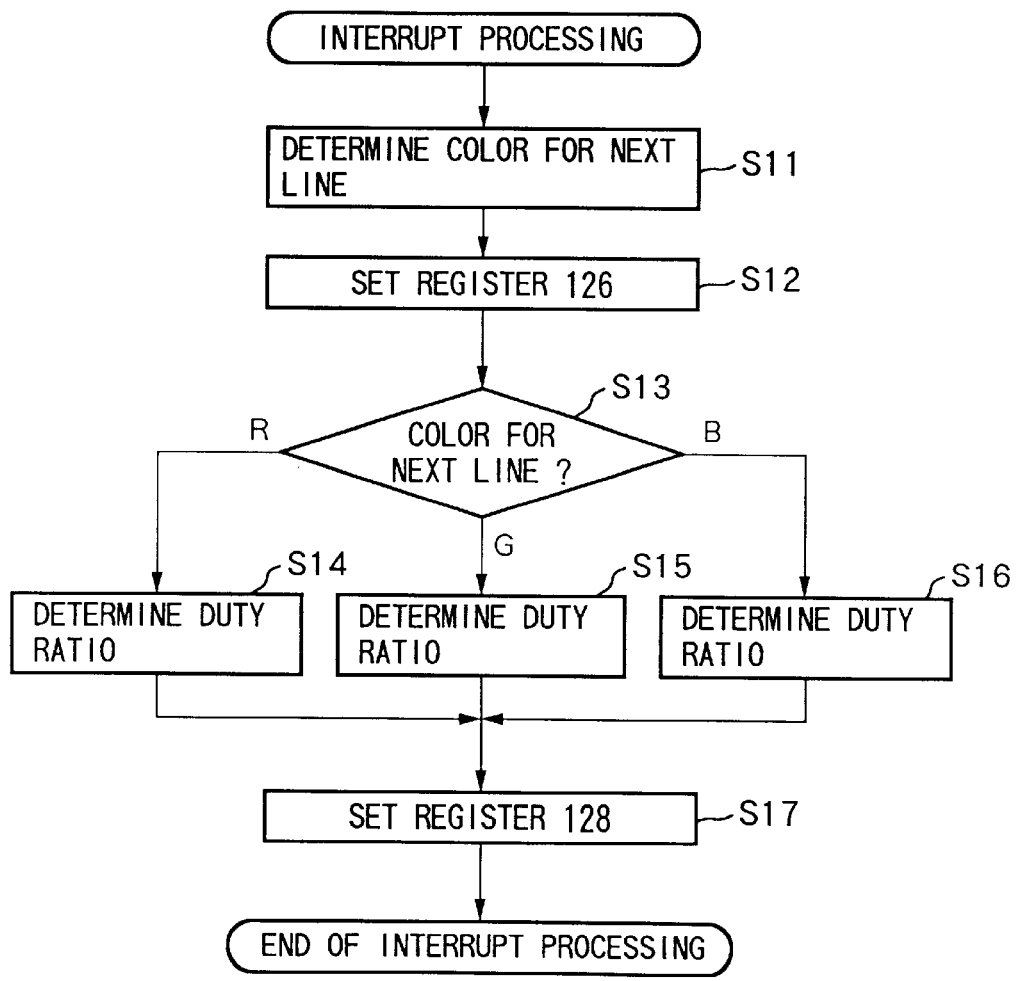
FIG. 6 is a flow chart showing interrupt processing according to the second embodiment of the present invention.

Parameter setting in the second embodiment will be explained with reference to the flow chart in FIG. 6 by exemplifying the case in which one line sync period is 5 ms.

In the following parameter setting operation according to the second embodiment, the total ON time of each LED light source calculated by the CPU 103 is 60% for the R LED light source 108, 30% for the G LED light source 109, and 20% for the B LED light source 110 with respect to one line sync period.

The total ON time of each LED light source is calculated from the product of the duty ratio and one line sync period. In the second embodiment, the CPU 103 calculates the total ON time of each LED light source in one line sync period at a predetermined timing (e.g., a duty ratio determination timing) by multiplying a duty ratio optimum for the LED light source of each color currently stored in a register 126, i.e., a duty ratio set by the CPU 103 as an optimum duty ratio in the previous parameter setting operation by one line sync period.

In initialization before reading an original, the CPU 103 sets the ON time of a color having the longest total ON time in the timer 133. In this case, since the R LED light source 108 has the longest total ON time, the CPU 103 sets 5 ms×60%=3 ms in the timer 133. When the timing control unit 129 outputs a sync signal SYNC after the start of read operation, the CPU 103 receives the sync signal SYNC and performs interrupt processing shown in the flow chart of FIG. 6. The interrupt processing has the following steps.

The CPU 103 determines the light source color for the next line in step S11, and writes the determined color information in the register 126 in step S12. As a result, the light source color for a read which starts from the next sync signal SYNC is reserved. The CPU 103 determines the color for the next output line in step S13. If the color for the next output line is R, the CPU 103 advances to step S14; if the color is G, to step S15; and if the color is B, to step S16.

The CPU 103 determines the PWM duty ratio in steps S14, S15, and S16 by the same procedure as described in the first embodiment with reference to FIG. 16, and writes the determined duty in a register 128 in step S17. As for R having the longest total ON time, the CPU 103 sets the PWM duty ratio to 100%. As for G, the. CPU 103 calculates Duty Ratio of G
= Total ON Time of G/Total ON Time of R
= 30/60 = 1/2 = 50% in order to generate a light quantity necessary for G within the same time (3 ms) as the ON time of R. As for B as well as G, the CPU 103 calculates Duty Ratio of B
= Total GN Time of G/Total ON Time of R
= 20/60 = 1/3 ≈ 33%

Figure 5:
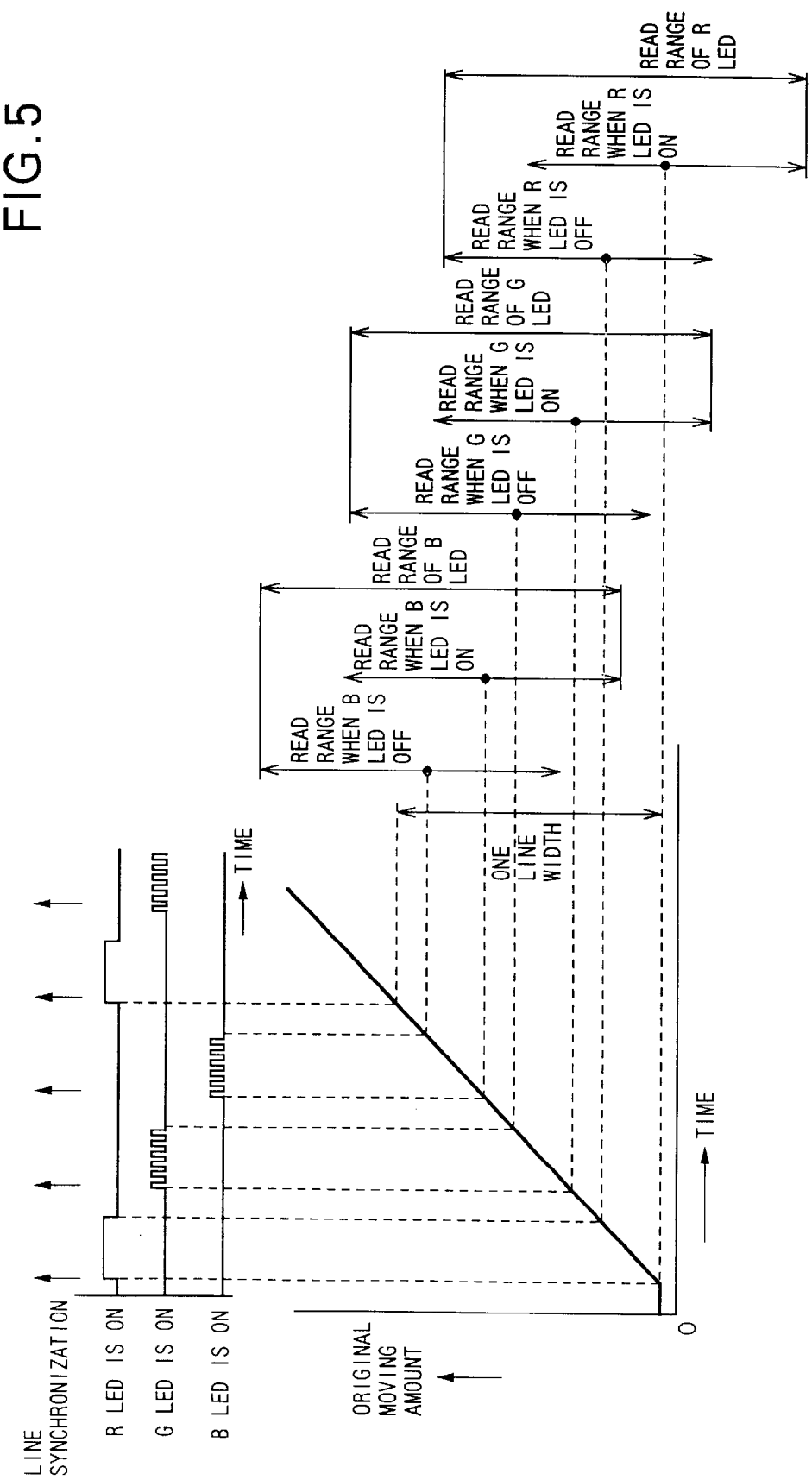
FIG. 5 is a view for explaining the relationship between the ON state of each LED and the original read position according to the second embodiment of the present invention.

FIG. 5 is a view showing an example in which time which is two-third of the line sync period is set as a predetermined time (the time until the LED light sources 108, 109, and 110 are turned off) counted by the timer 133 by the above method, and the PWM duty ratios of R, G, and B are respectively set to 100%, 50%, and 33%. Since the second embodiment employs this setting, even if the light sources of the respective colors have different light emission quantities, they can have the same resolution in the subscanning direction. Further, the resolution in the subscanning direction can be maximized to the limit of each sensor.

In the second embodiment, the PWM duty ratio is set to 100% for a color having the longest total ON time, and the duty ratio for another color is calculated on the basis of the longest total ON time of the color. The actual original read ranges for the respective colors can be made equal while ensuring necessary light quantities. Consequently, the resolution of a read image can be increased while maintaining good color reproducibility of a black thin horizontal line or halftone dot image.

In the second embodiment, the R LED light source 108 having the longest ON time has a duty ratio of 100%. In this case, variations in light quantity of the LED light source may influence the resolution in the subscanning direction. For example, when the light quantity of the LED is large, the ON time is controlled short to increase the resolution. To prevent the influence of variations in light quantity of LED on the resolution of a read image, an ON time necessary for an LED having the smallest light quantity, i.e., an LED most greatly varying in light quantity is set as a predetermined time (the time until the LED light source is turned off) of the timer 133. An LED having the smallest light quantity is determined in design with reference to the product specifications (numerical data) of LEDs of the respective colors.

A method of determining the flickering duty ratio of each color will be described. For example, when the predetermined time, i.e., the time set in design as the time until an LED having the smallest light quantity is turned off is 80% of one line sync period, and the total ON time of a given color by flickering is 60% of one line sync period, the CPU 103 determines the duty ratio of this color to 60/80=3/4. By setting (necessary ON time)/(ON time necessary for an LED having the smallest light quantity) as a duty ratio, the resolutions of the respective colors in the subscanning direction can be made equal and increased without any influence of variations in light quantity of the LED. In other words, the resolution can be increased while suppressing variations between LED products and maintaining good color reproducibility of a black thin horizontal line or halftone dot image.

Third Embodiment

Figure 7:
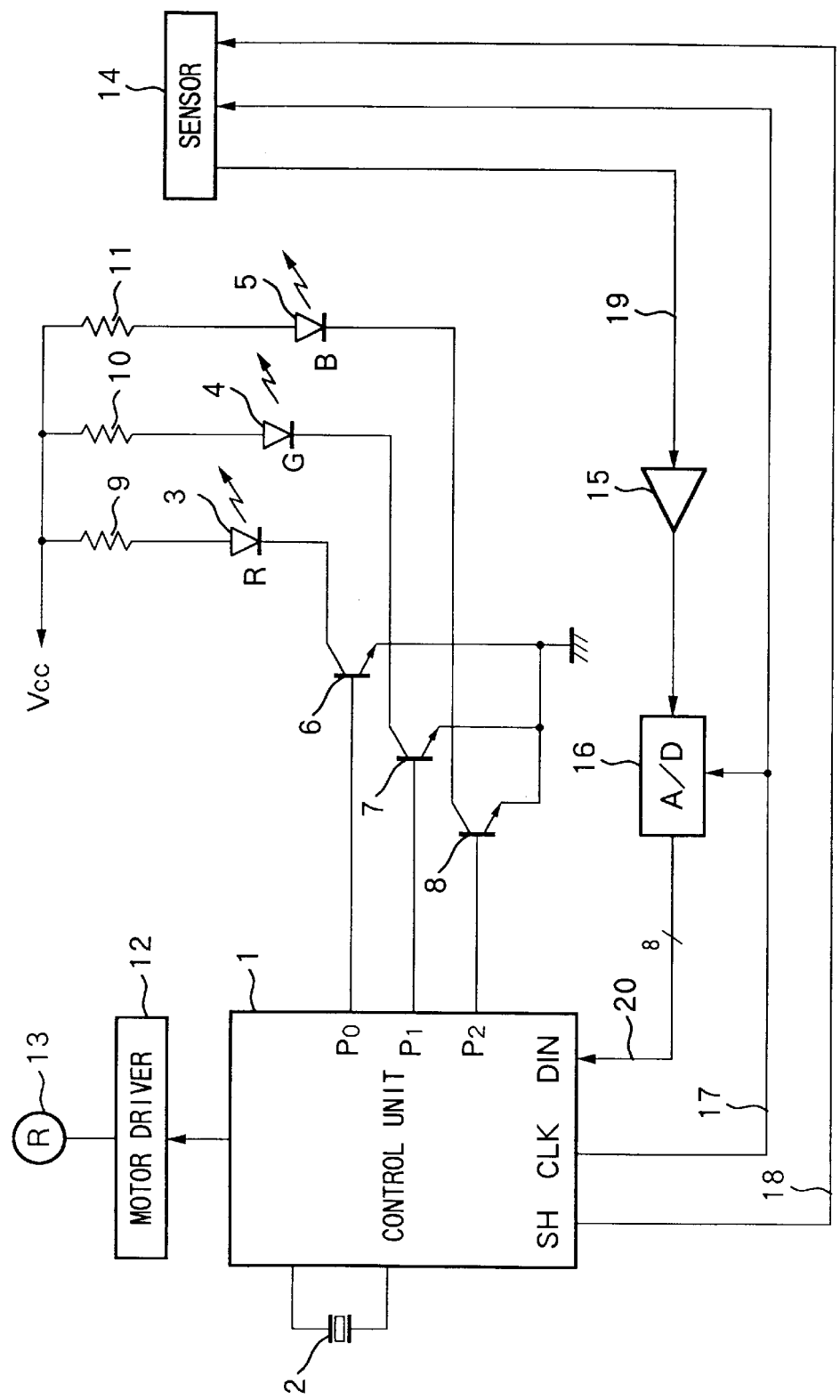
FIG. 7 is a diagram showing an example of the arrangement of a color facsimile apparatus according to the third embodiment of the present invention.

The third embodiment of the present invention will be described. FIG. 7 is a block diagram showing an example of the arrangement of a read control unit of a color facsimile apparatus to which the image reading apparatus of the present invention is applied.

In FIG. 7, reference numeral 1 denotes a control unit which controls the whole facsimile apparatus, and controls the whole facsimile apparatus in accordance with a program written in a ROM (not shown); 2, an oscillator for generating a reference clock for operating the control unit 1; 3, a red (R) LED; 4, a green (G) LED; 5, a blue (B) LED; 6, 7, and 8, transistors for driving (turning on) the LEDs 3, 4, and 5 of the respective colors; and 9, 10, and 11, limiting resistors for the LEDs 3, 4, and 5 of the respective colors.

Reference numeral 12 denotes a motor driver; 13, a motor for conveying an original to be read; 14, an image sensor represented by a CCD or the like; 15, an amplifier; 16, an A/D converter; 17, a transfer clock for one pixel; 18, a line sync signal determined by the accumulation time of the image sensor 14; 19, an image signal output from the image sensor 14; and 20, an image signal converted into digital data by the A/D converter 16.

<Operation in Color Mode>

Operation in a color read (color mode) and a method of determining the ON time of the light source of each color will be explained. When ports P0, P1, and P2 of the control unit 1 change to high level, the collector-to-emitter paths of the transistors 6, 7, and 8 respectively connected to these ports become conductive to flow a current through the LEDs 3, 4, and 5 and turn them on.

Figure 8:
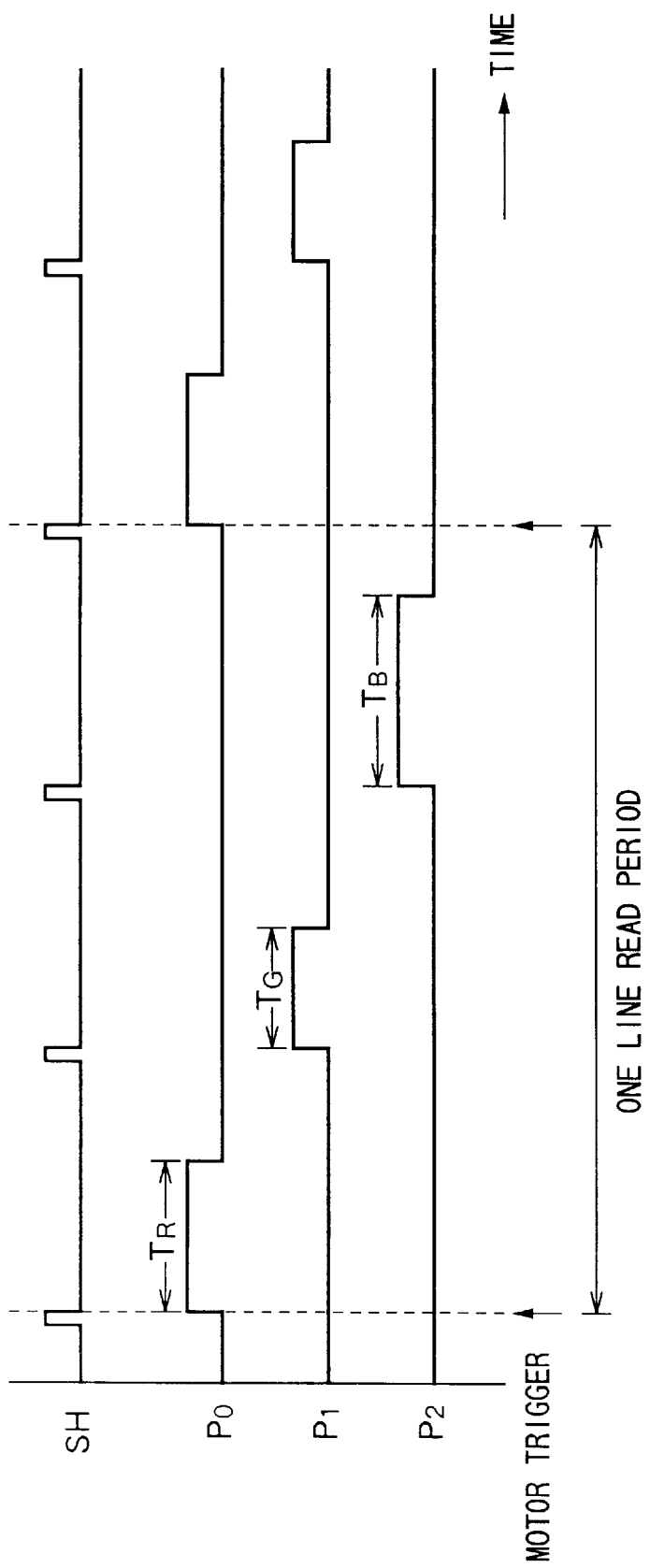
FIG. 8 is a timing chart showing the ON timing of each light source in a color read according to the third embodiment of the present invention.

FIG. 8 shows the ON timings of the LEDs 3, 4, and 5 in a color read. In a color read, image signals 19 of R, G, and B components for one read line must be obtained. For this purpose, the R, G, and B light sources are switched every timing at which the control unit 1 outputs the line sync (SH) signal 18 (the ports P0, P1, and P2 are sequentially changed to high level in synchronism with the SH signal 18) to obtain image signals 19 when the LEDs 3, 4, and 5 are turned on.

After the LEDs of three colors are turned on for one line (an original is read by the LEDs of three colors), the control unit 1 issues a trigger to the motor driver 12 to advance the original by a distance corresponding to one scanning line density. By repeatedly executing this, one page of a color original is read.

The image signal 19 output from the image sensor 14 is amplified by the amplifier 15, and converted into a digital signal by the A/D converter 16 upon sampling and holding at the timing of the transfer clock 17. Since the third embodiment adopts an 8-bit A/D converter, one pixel is converted into 8-bit digital data. The 8-bit digital data can be expressed by 256 gray levels.

The image signal 20 which is converted into a digital signal and input to the control unit 1 is subjected to image processing such as shading correction or γ conversion and suitable data processing in the control unit 1. If the level of an image signal input to the A/D converter 16 is too high, the A/D converter 16 overflows, failing to obtain correct digital data corresponding to the input analog image signal. If the input analog image signal is too small, the dynamic range of the A/D converter 16 is not effectively used to decrease the gradation.

An output from the image sensor 14 is determined by the light quantity of the LED light source and the sensitivity of the sensor, and varies between devices. To absorb these variations and obtain a predetermined output with respect to a given reference, ON control for properly adjusting the light quantity of the LED light source must be performed. The light quantity is adjusted by controlling the ON times of the R, G, and B light sources.

Figure 9:
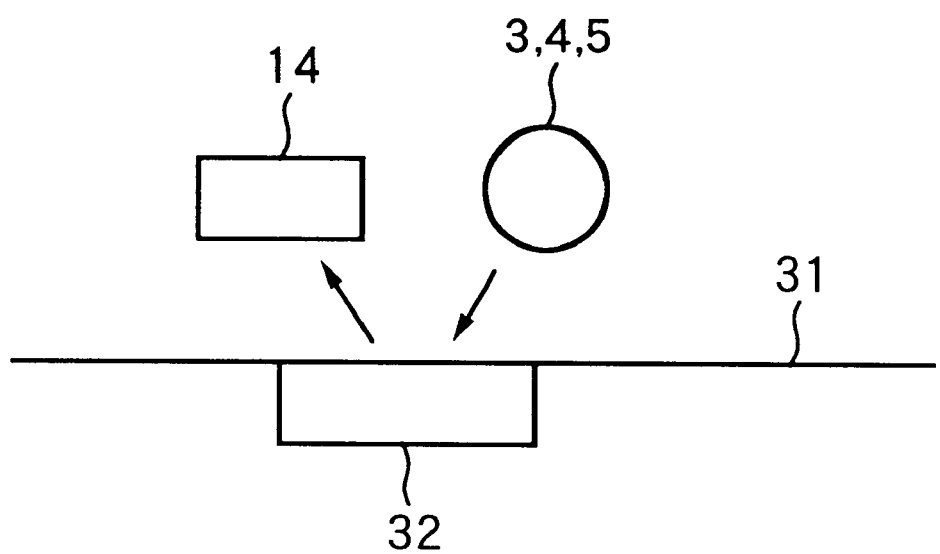
FIG. 9 is a view schematically showing the relationship between the original table, light source, and image sensor.

A method of setting the ON times of the R, G, and B light sources will be described. FIG. 9 schematically shows the relationship between the original table, light source (LEDs 3, 4, and 5), and image sensor 14. In FIG. 9, reference numeral 31 denotes an original table on which an original to be read is passed; and 32, a reference white background.

In determining the ON time of each light source, e.g., the R LED 3, a CPU 103 turns on the R LED 3 at a timing described earlier as the timing of executing the duty ratio determination processing in the first embodiment by changing the port P0 to high level at a timing of issuing the SH signal 18 from the control unit 1 while no original is set (the white reference plate is to be read). The R LED 3 is kept on for an appropriate time during one period of the SH signal 18. That is, an output (image signal) from the image sensor 14 when red light illuminates the reference white background 32 is obtained.

An A/D-converted image signal 20 is checked. When the maximum value (FFh in this case) of the A/D converter 16 appears, the ON time is shortened to read the reference white background 32 again. This is repeatedly executed until no maximum value FFh appears. When no maximum value FFh of the A/D converter 16 appears, the ON time is prolonged to read the reference white background 32 again. This is repeatedly executed until the maximum value FFh appears.

By this operation, the ON time during which the peak value of an output from the A/D converter 16 is maximized at a value lower than FFh upon reading the reference white background 32 is obtained. In other words, an ON time immediately before the peak value of an output from the A/D converter 16 reaches FFh is obtained. In the example of FIG. 8, $T_R$ represents the ON time of the R LED 3.

This ON time is obtained by counting, by a counter (not shown) built in the control unit 1, the number of clocks (to be referred to as ON clocks) prepared by properly dividing the reference clock 17 generated by the oscillator 2 of the control unit 1. A count value immediately before the A/D-converted value reaches FFh upon reading the reference white background 32 is stored in a RAM (not shown). Further, read data of the reference white background 32 at this time is stored in the RAM as red shading correction data.

When an original is actually read under red light, the port P0 is changed to high level at the same time as the control unit 1 issues the SH signal 18, and the number of ON clocks is counted by the counter. If the counted value coincides with a count value stored in the RAM, the port P0 is changed back to low level.

The same operation is performed for the G and B LEDs 4 and 5 to obtain ON times ($T^G$ and $T_B$ in the example of FIG. 8) and store them in the RAM. At the same time, green and blue shading correction data are also stored in the RAM. When an original is actually read under green or blue light, the port P1 or P2 is changed to high level at the same time as the control unit 1 issues the SH signal 18, and the number of ON clocks is counted by the counter. If the counted value coincides with the green or blue count value stored in the RAM, the port P1 or P2 is changed back to low level.

Figure 10:
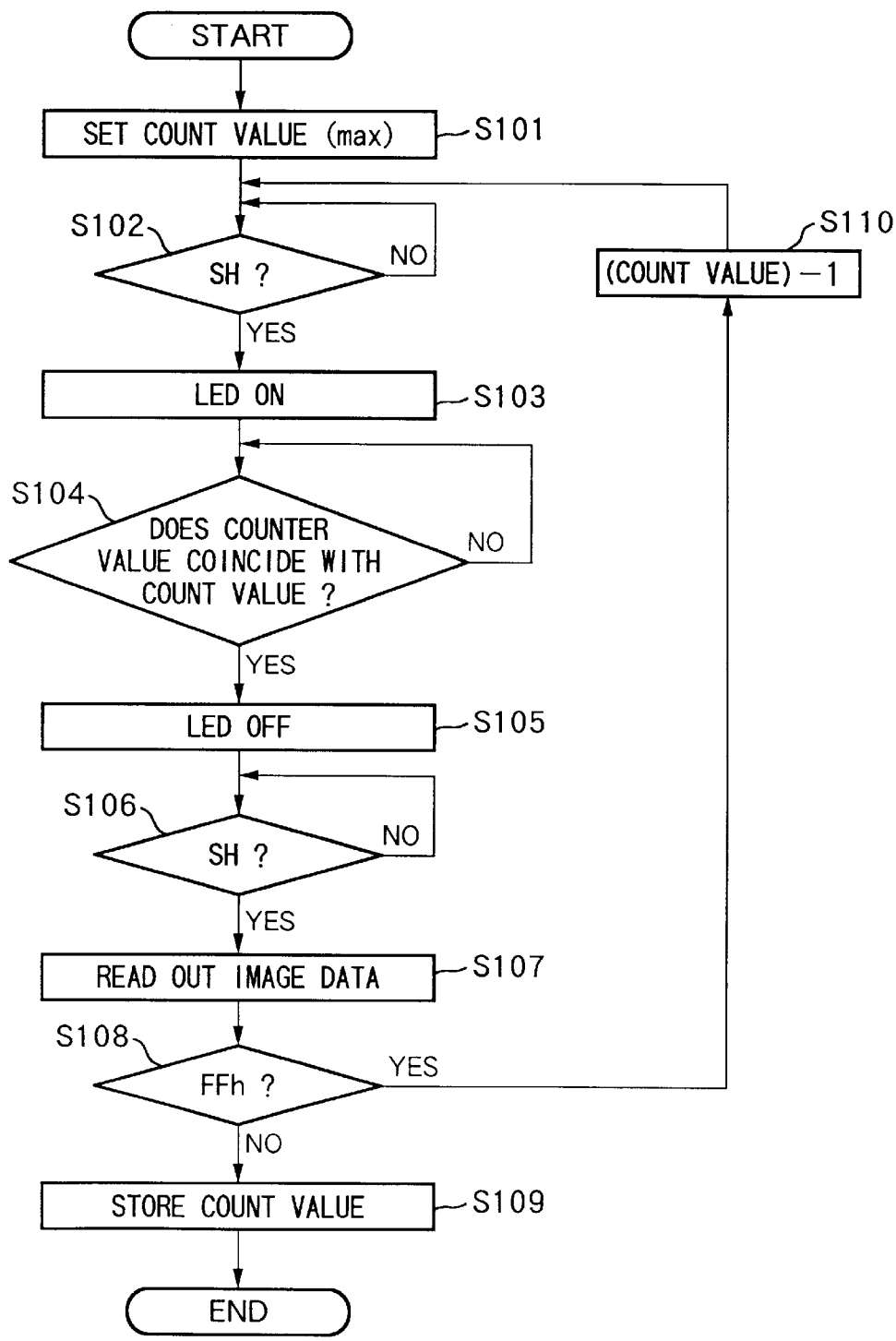
FIG. 10 is a flow chart showing a process of obtaining the ON time of each light source in a color read according to the third embodiment of the present invention.

FIG. 10 is a flow chart showing a process of determining the ON times of the LEDs 3, 4, and 5. A method of determining the ON time will be explained again with reference to FIG. 10.

An allowable maximum count value of the ON clock is set in the RAM in step S101. After the maximum value is set, the flow waits for issue of the SH signal 18 in step S102, and advances to step S103 at the issue timing of the SH signal 18 to turn on the LED.

The ON clock counter is checked in step S104, and if the counted value coincides with the count value set in the RAM, the flow advances to step S105 to turn off the LED. The flow waits for issue of a next SH signal 18 in step S106, and advances to step S107 after the SH signal 18 is issued. In step S107, image data which are output from the image sensor 14, converted into digital data by the A/D converter 16, and sequentially output in steps S103 to S105 are read out.

The readout image data are checked in step S108. If the data include the maximum value FFh of the A/D converter 16, the flow advances to step S110 to decrement the count value set in the RAM by one and set the new count value in the RAM, and returns to processing in step S102. If NO in step S108, the current count value is determined to be optimum, stored in the RAM, and used as the ON time of the LED in a subsequent color read. This process is common to the R, G, and B light sources.

<Operation in Monochrome Mode>

Figure 11:
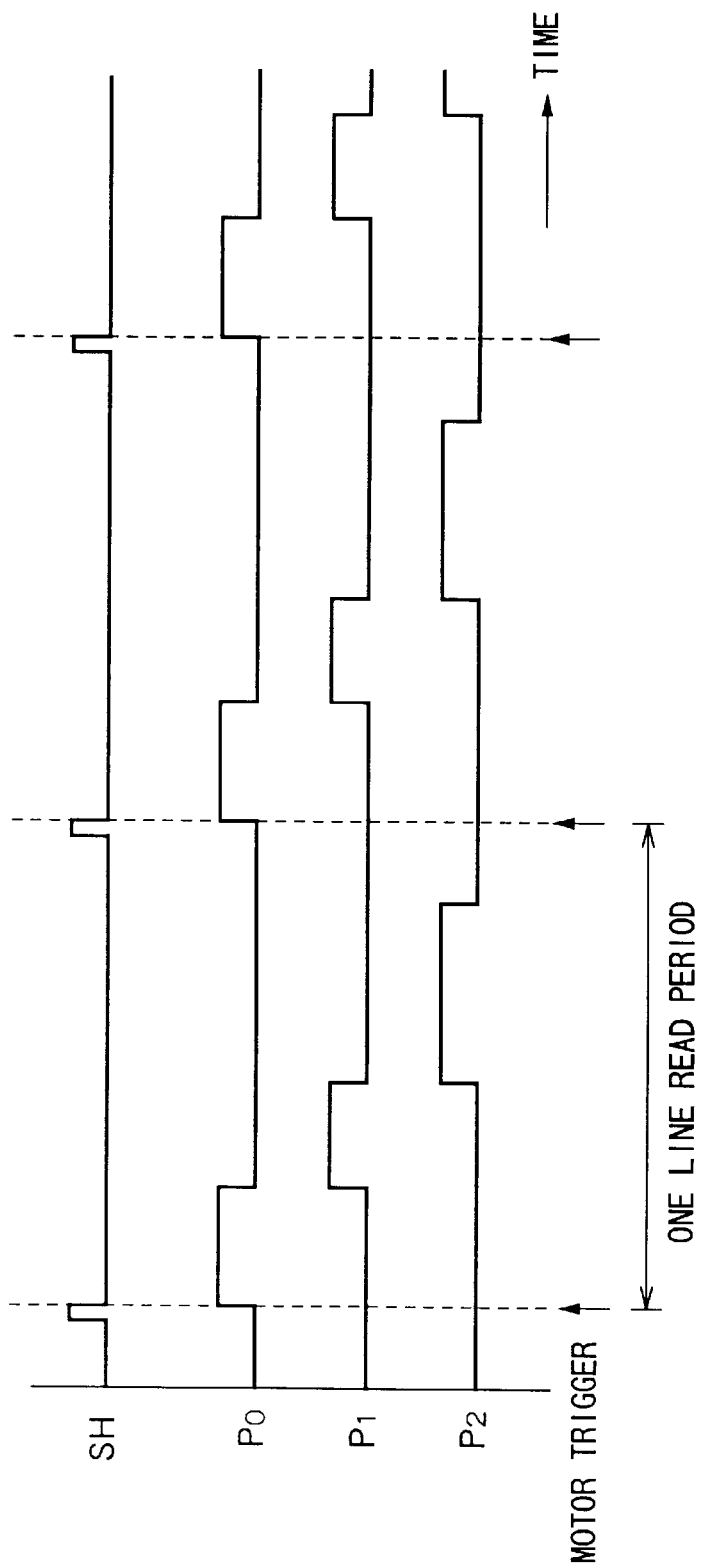
FIG. 11 is a timing chart showing the ON timing of each light source in a monochrome read according to the third embodiment of the present invention.

A monochrome read (monochrome mode) will be explained. In the monochrome mode, a pseudo white light source must be formed by sequentially turning on the LED light sources of the respective colors during one line sync period. According to the third embodiment, in the monochrome mode, as shown in FIG. 11, the R, G, and B light sources are sequentially turned on during one accumulation period (one period of the SH signal 18) in accordance with the ratio of ON times, while the ratio of the ON times of the R, G, and B light sources determined in the color mode are held. The ON time of each light source during one accumulation period is determined as follows.

The reference white background 32 is read by sequentially turning on the R, G, and B light sources for 1/3 the ON times of the light sources determined in the color mode for convenience. Similar to the color mode, if A/D-converted image data 20 includes the maximum value FFh of the A/D converter 16, all the ON times are decreased with the same ratio of the ON times of the R, G, and B light sources, and the reference white background 32 is read again. This is repeatedly executed until no maximum value FFh appears.

If no maximum value FFh is included in the image data 20, all the ON times are increased with the same ratio of the ON times of the R, G, and B light sources, and the reference white background 32 is read again. This is repeatedly executed until the maximum value FFh appears. By this operation, the ON time during which the peak value of an output from the A/D converter 16 is maximized at a value lower than FFh upon reading the reference white background 32 is obtained. In other words, an ON time immediately before the peak value of an output from the A/D converter 16 reaches FFh is obtained.

This ON time is obtained by counting, by a counter (not shown) included in the control unit 1, the number of ON clocks prepared by properly dividing the reference clock 17 generated by the oscillator 2 of the control unit 1. The count values of the ON, times of the R, G, and B light sources immediately before the A/D-converted value reaches FFh upon reading the reference white background 32 are stored in a RAM (not shown). Further, read data of the reference white background 32 at this time is stored in the RAM as shading correction data.

When an original is actually read in the monochrome mode, the port P0 is changed to high level to turn on the R LED 3 at the same time as issue of the SH signal 18 from the control unit 1. The number of ON clocks is counted by the counter. If the counted value coincides with the R count value stored in the RAM, the port P0 is changed back to low level. After the port P0 is at low level, the port P1 is changed to high level to turn on the G LED 4, and the number of ON clocks is counted by the counter. If the counted value coincides with the G count value stored in the RAM, the port P1 is changed back to low level. Subsequently, the port P2 is changed to high level to turn on the B LED 5, and the number of ON clocks is counted by the counter. If the counted value coincides with the B count value stored in the RAM, the port P2 is changed back to low level. In this manner, all the LEDs are turned on for one line.

In determining the ON time of each light source, the ON time is prolonged/shortened as follows. ON clocks are combined in units of a given number (e.g., A), and the ON time is prolonged/shortened in units of A for a color having the shortest ON time. The ON time is prolonged/shortened as follows for another color.

Assume that the G LED 4 has the shortest ON time. In this case, the ON time of the G LED 4 is prolonged by the unit time A. The ON time of the R LED 3 is prolonged by $$(T_R/T_G) \times A$$

$T_R$: the ON time of the R LED 3 in a color read
$T_G$: the ON time of the G LED 4 in a color read
The ON time of the B LED 5 is prolonged by $$(T_B/T_G) \times A$$

$T_B$: the ON time of the B LED 5 in a color read
For example, the ON time of the R LED 3 is 1.3 times that of the G LED 4, the ON time of the B LED 5 is 1.6 times that of the G LED 4, and the unit time A has a value of 10. If the ON clock count value is incremented/decremented by 10 for the ON time of the G LED 4, the count value of the R LED 3 is incremented/decremented by 13, and the count value of the B LED 5 is incremented/decremented by 16. Further, the ON time can be more finely set by shortening the period of the ON clock and increasing the value of the unit time A.

Figure 12:
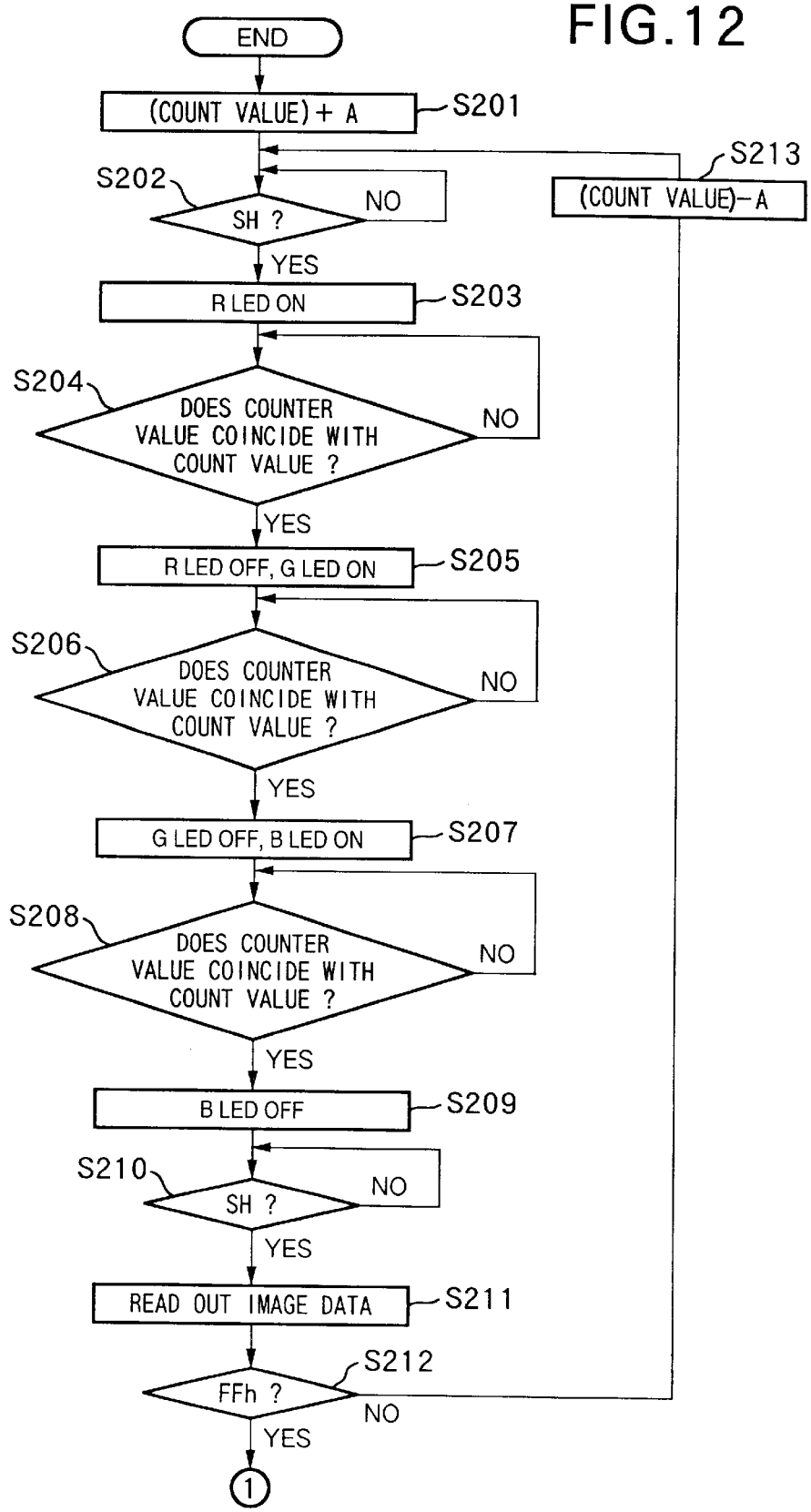
FIG. 12 is a flow chart showing a process of obtaining the ON time of each light source in a monochrome read according to the third embodiment of the present invention.
Figure 13:
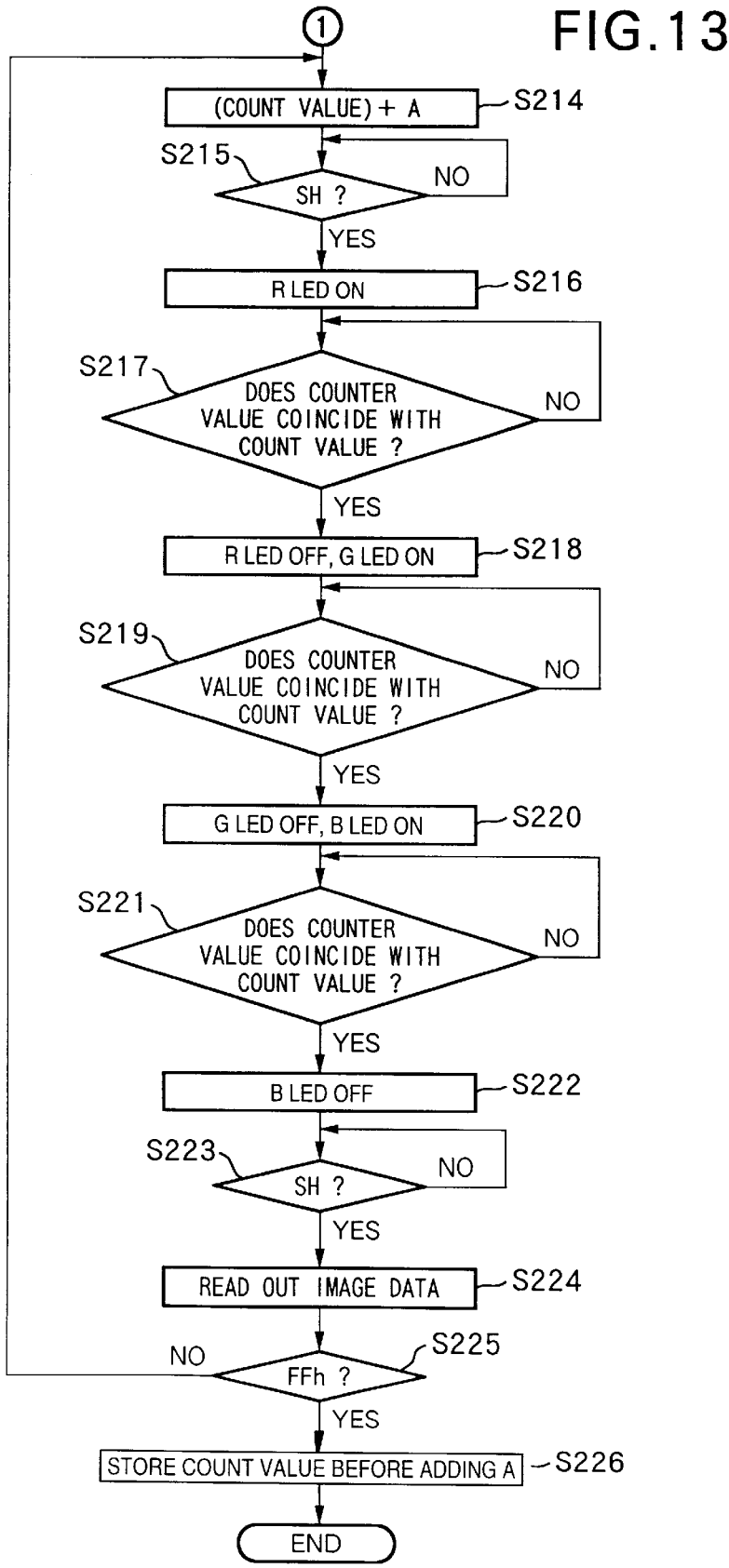
FIG. 13 is a flow chart showing the process of obtaining the ON time of each light source in a monochrome read according to the third embodiment of the present invention.

FIGS. 12 and 13 are flow charts showing a process of determining the ON times of the LEDs 3, 4, and 5 in the monochrome mode. A method of determining the ON time will be explained again with reference to FIGS. 12 and 13.

In FIG. 12, a count value which is 1/3 the ON time of each color obtained for a read in the color mode is set in the RAM.

After the count value is set, the flow waits for issue of the SH signal 18 in step S202, and the R LED 3 is turned on at the issue timing of the SH signal 18 in step S203. The ON clock counter is checked in step S204. If the counted value coincides with the count value of the ON time of the R LED 3 set in the RAM, the flow advances to step S205 to turn off the R LED 3 and turn on the G LED 4.

The ON clock counter is checked in step S206. If the counted value coincides with the count value of the ON time of the G LED 4 set in the RAM, the flow advances to step S207 to turn off the G LED 4 and turn on the B LED 5. The ON clock counter is checked in step S208. If the counted value coincides with the count value of the ON time of the B LED 5 set in the RAM, the flow advances to step S209 to turn off the B LED 5.

The flow waits for issue of a next SH signal 18 in step S210, and advances to step S211 after the SH signal 18 is issued. In step S211, image data which are output from the image sensor 14, converted into digital data by the A/D converter 16, and sequentially output in steps S203 to S209 are read out. The readout image data are checked in step S212. If the data include the maximum value FFh of the A/D converter 16, the flow advances to step S213.

The count value in the RAM for a light source having the shortest ON time is decremented by the unit time A and set in the RAM. The count value for another light source is decremented by the product of the unit time A and the ratio of the ON time to the shortest ON time (if the ratio of the ON time is 1.3, the product of A and 1.3). The resultant count value is set in the RAM. Then, the flow returns to processing in step S202.

If NO in step S212, the flow advances to step S214 in FIG. 13. In step S214, the count value in the RAM for a light source having the shortest ON time is incremented by the unit time A and set in the RAM. The count value for another light source is incremented by the product of the unit time A and the ratio of the ON time to the shortest ON time (if the ratio of the ON time is 1.3, the product of A and 1.3). The resultant count value is set in the RAM.

The flow advances to step S215 to wait for issue of the SH signal 18. At the issue timing of the SH signal 18, the R LED 3 is turned on in step S216. The ON clock counter is checked in step S217. If the counted value coincides with the count value of the ON time of the R LED 3 set in the RAM in step S214, the flow advances to step S218 to turn off the R LED 3 and turn on the G LED 4.

The ON clock counter is checked in step S219. If the counted value coincides with the count value of the ON time of the G LED 4 set in the RAM in step S214, the flow advances to step S220 to turn off the G LED 4 and turn on the B LED 5. The ON clock counter is checked in step S221. If the counted value coincides with the count value of the ON time of the B LED 5 set in the RAM in step S214, the flow advances to step S222 to turn off the B LED 5.

The flow waits for issue of a next SH signal 18 in step S223, and advances to step S224 after the SH signal 18 is issued. In step S224, image data which are output from the image sensor 14, converted into digital data by the A/D converter 16, and sequentially output in steps S216 to S222 are read out. The readout image data are checked in step S225. If the data do not include the maximum value FFh of the A/D converter 16, the flow returns to step S214.

If the readout image data includes the maximum value FFh, the flow advances to step S226 to determine that the count value before processing in step S214 is optimum. A count value set before one operation is stored in the RAM and used as the ON time of the LED in a read in the monochrome mode.

According to the third embodiment, the three R, G, and B light sources are switched during one line sync period. In addition, the LED light sources are turned on for different optimum ON times. When an original is read in the monochrome mode using an image sensor capable of reading a color original, an ideal pseudo white light source can be formed. A light source controlled to equal light quantities for the respective colors without exclusively using a certain emission color of the LED light source can be realized. An output from the image sensor which maximizes the capacity of the image processing system can be obtained. Since the light quantities of the respective light sources are uniformly used, variations in degradation of the light sources such that only a given light source degrades soon can be eliminated.

Figure 14:
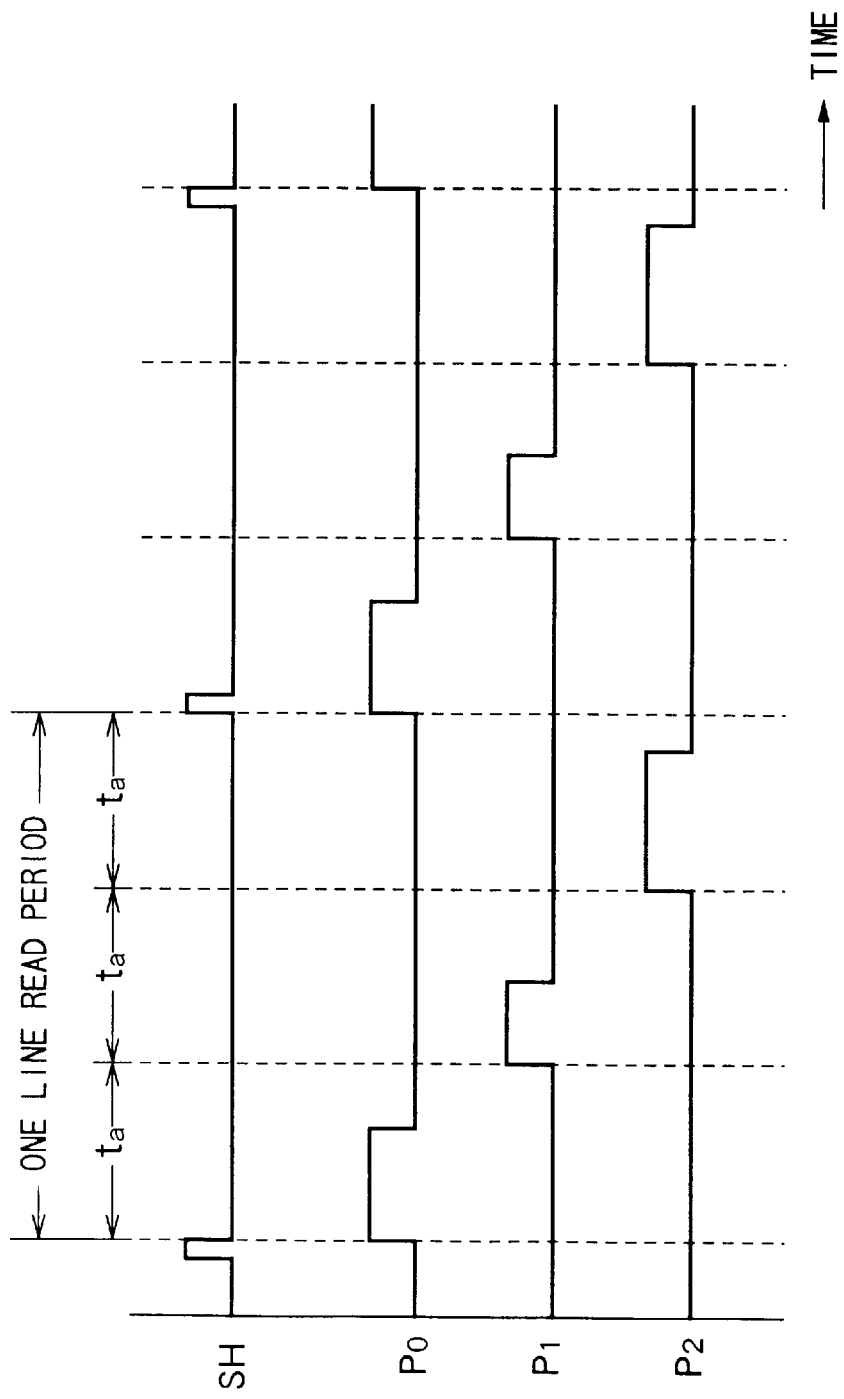
FIG. 14 is a timing chart showing another example of the ON timing of each light source in a monochrome read according to the third embodiment of the present invention.

In the third embodiment, the light sources of three colors are successively sequentially turned on in a read in the monochrome mode. Instead, as shown in FIG. 14, one accumulation period of the image sensor 14 may be divided into three, and the light source of each color may be turned on during the 1/3 period ta. This setting can average the density of one read line.

Another Embodiment

The present invention may be applied to a system constituted by a plurality of devices (e.g., a host computer, an interface device, a reader, a printer, a scanner, and a facsimile apparatus) or an apparatus comprising a single device (e.g., a copying machine, a scanner, or a facsimile apparatus).

The present invention is realized even by supplying software program codes for realizing the functions of the above embodiments to a computer in a system or apparatus connected to various devices so as to operate these devices in order to realize the functions of the above-described embodiments, and operating the devices in accordance with the program stored in the computer (CPU or MPU) of the system or apparatus. The present invention may be constituted by hardware.

In this case, the software program codes realize the functions of the above-described embodiments by themselves, and the program codes and a means for supplying the program codes to the computer, e.g., a storage medium storing the program codes constitute the present invention. As a storage medium for supplying the program codes, a floppy disk, a hard disk, an optical disk, a magneto optical disk, a CD-ROM, a magnetic tape, a nonvolatile memory card, a ROM, or the like can be used.

The functions of the above-described embodiments are realized not only when the supplied program codes are executed by the computer but also when the program codes cooperate with the OS (Operating System) running on the computer, another application software, or the like. These program codes are included in the embodiments of the present invention.

The functions of the above-described embodiments are also realized when the supplied program codes are stored in the memory of a function expansion board of the computer or a function expansion unit connected to the computer, and the CPU of the function expansion board or function expansion unit performs part or all of actual processing on the basis of the instructions of the program codes.

As has been described above, according to the first embodiment, the light sources of the respective colors flicker during one accumulation period of the image sensor, and the flickering duty ratio is set for each color. Even if the light sources of the respective colors have different light emission quantities, they can have the same resolution in the subscanning direction.: While suppressing variations in light quantities of the light sources (making the original read ranges of the respective light source colors equal), the color reproducibility of a thin horizontal line or halftone dot image can be improved.

According to the second embodiment, a light source having the longest ON time in the total ON time of a plurality of light sources during one accumulation period is flickered for a predetermined time during one accumulation period. The ON duty ratio of another light source is set based on the predetermined time and the total ON time set in advance for this light source. As a result, the original read ranges of the respective colors can be made equal and decreased. While maintaining good color reproducibility of a black horizontal line or halftone dot image, the resolution can be increased.

According to the third embodiment, when an original is read in the monochrome mode in the image reading apparatus capable of reading a color original, the light sources are sequentially turned on during one accumulation period of the image sensor by switching the light sources of three colors. This realizes a reading system capable of reducing the power consumption while eliminating variations in degradation of the light sources such that only a given light source degrades soon.

Further, according to the third embodiment, the ratio of the ON times of the light sources in reading an image in the monochrome mode is set equal to the ratio of the ON times in reading a color original. The whole ON time of the light sources (the sum of the ON times of the light sources) during one line sync period is set to a maximum value within the range of the convertibility of the A/D converter upon reading a reference white background. Accordingly, a pseudo white light source controlled to equal light quantities for the respective colors without exclusively using a certain color can be realized. A high-quality image which accurately expresses the density of an original can be read, and an output from the image sensor which maximizes the ability of the image processing system can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus which reads an original image by sequentially irradiating the original image with a plurality of emission colors and detecting light of each color from the original image by an image sensor, comprising:
   a light source capable of sequentially generating the plurality of emission colors in accordance with an emission control signal; and
   control unit adapted to supply the emission control signal so as to change the emission color of said light source every predetermined charge accumulation period of the image sensor, and turn on-and-off of said light source a plurality number of times uniformly during the charge accumulation period in accordance with a duty ratio set for each emission color.

2. The apparatus according to claim 1, wherein when a reference white background is irradiated by turning on-and-off of said light source with one of the plurality of emission colors, and an output value from the image sensor is smaller than a predetermined value and comes nearest to the predetermined value, said control unit sets a duty ratio at this time as an optimum duty ratio for the emission color, said control unit repeating the duty ratio setting operation for each of the plurality of emission colors.

3. The apparatus according to claim 2, wherein said control unit performs the duty ratio setting operation for each emission color before the original image is read.

4. The apparatus according to claim 1, wherein said control unit reads an entire original image by repeating turning on-and-off of said light source and change of the emission color at a predetermined pitch a plurality of number of times.

5. The apparatus according to claim 1, further comprising light sources for the plurality of emission colors.

6. A method of controlling an image reading apparatus which reads an original image by sequentially irradiating the original image with a plurality of emission colors and detecting light of each color from the original image by an image sensor, comprising:
   supplying an emission control signal to change the emission color of a light source every predetermined charge accumulation period of the image sensor, the light source capable of sequentially generating the plurality of emission colors in accordance with the emission control signal, and turning on-and-off of the light source a plurality number of times uniformly during the charge accumulation period in accordance with a duty ratio set for each emission color.

7. The method according to claim 6, further comprising, when a reference white background is irradiated by turning on-and-off of the light source with one of the plurality of emission colors, and an output value from the image sensor is smaller than a predetermined value and comes nearest to the predetermined value, setting a duty ratio at this time as an optimum duty ratio for the emission color, the duty ratio setting operation being repeated for each of the plurality of emission colors.

8. An image reading apparatus which reads an original image by detecting, by an image sensor, light from the original image irradiated by a light source, comprising:
   a control unit adapted to control a single light source for irradiating the original image to flicker a plurality of number of times uniformly during every predetermined charge accumulation time of the image sensor when the original image is read,
   wherein said control unit adjusts a flickering duty ratio of the light source for reading the original image based on an output value from the image sensor when the image sensor reads a reference background irradiated by flickering the light source a plurality of number of times.

9. The apparatus according to claim 8, wherein when the reference background is irradiated by flickering the light source a plurality of number of times, and an output value from the image sensor is smaller than a predetermined value and comes nearest to the predetermined value, said control unit selects the flickering duty ratio of the light source at this time as an optimum duty ratio for reading the original image.

10. The apparatus according to claim 9, wherein said control unit performs the duty ratio adjustment operation before the original image is read.

11. A method of controlling an image reading apparatus which reads an original image by detecting, by an image sensor, light from the original image irradiated by a light source, comprising:
   controlling a single light source for irradiating the original image to flicker a plurality of number of times uniformly during every predetermined charge accumulation time of the image sensor when the original image is read,
   wherein the step of controlling adjusts a flickering duty ratio of the light source for reading the original image based on an output value from the image sensor when the image sensor reads a reference background irradiated by flickering the light source a plurality of number of times.

12. The method according to claim 11, further comprising the step of, when the reference background is irradiated by flickering the light source a plurality of number of times, and an output value from the image sensor is smaller than a predetermined value and comes nearest to the predetermined value, selecting the flickering duty ratio of the light source at this time as an optimum duty ratio for reading the original image.

13. The method according to claim 12, wherein the step of controlling adjusts the duty ratio before the original image is read.

14. An image reading apparatus which reads an original image by sequentially irradiating the original image with a plurality of emission colors and detecting light of each color from the original image by an image sensor, comprising:
   a light source capable of sequentially generating the plurality of emission colors in accordance with an emission control signal; and
   control unit adapted to supply the emission control signal so as to change the emission color of said light source every charge accumulation period, and repeat, in the charge accumulation period, turning on-and-off of said light source with a first emission color of the plurality of emission colors a plurality of number of times, wherein the number of times of turning on-and-off of said light source with the first emission color is different from a number of times of turning on-and-off of said light source with a second emission color different from the first emission color of the plurality of emission colors.

15. The apparatus according to claim 14, wherein said control unit sets a duty ratio of another emission color using, as a reference, a total ON time of one of the plurality of emission colors in the predetermined charge accumulation period of the image sensor.

16. The apparatus according to claim 15, wherein said control unit calculates the duty ratio of said light source for each emission color, calculates a product of the calculated duty ratio and the predetermined charge accumulation period of the image sensor to calculate the total ON time for each color, and selects a product of an emission color having the largest calculated value as the reference total ON time.

17. The apparatus according to claim 16, wherein when a reference white background is irradiated by repeating on-and-off of said light source with one of the plurality of emission colors, and an output value from the image sensor is smaller than a predetermined value and comes nearest to the predetermined value, said control unit sets the duty ratio at this time as an optimum duty ratio for the emission color, said control unit repeating the duty ratio setting operation for each of the plurality of emission colors.

18. The apparatus according to claim 15, wherein said control unit selects, as a reference, a total ON time of an emission color having the smallest light quantity selected in advance from the plurality of emission colors.

19. The apparatus according to claim 15, wherein said control unit holds an ON state over the total ON time by setting the duty ratio of the emission color selected as the reference of the total ON time from the plurality of emission colors to 100%.

20. The apparatus according to claim 14, wherein said control unit performs the duty ratio setting operation for each emission color before the original image is read.

21. The apparatus according to claim 14, wherein said control unit reads an entire original image by repeating on-and-off of said light source and change of the emission color at a predetermined pitch a plurality of number of times.

22. The apparatus according to claim 14, wherein said image reading apparatus comprises light sources for the plurality of emission colors.

23. A method of controlling an image reading apparatus which reads an original image by sequentially irradiating the original image with a plurality of emission colors and detecting light of each color from the original image by an image sensor, comprising:

supplying an emission control signal to change the emission color of a light source every charge accumulation period, the light source capable of sequentially generating the plurality of emission colors in accordance with the emission control signal, and repeating, in the charge accumulation period, turning on-and-off of said light source with a first emission color of the plurality of emission colors a plurality of number of times, wherein the number of times of turning on-and-off of said light source with the first emission color is different from a number of times of turning on-and-off of said light source with a second emission color different from the first emission color of the plurality of emission colors.

* * * * *